Feb. 5, 1935.  A. H. REIBER ET AL  1,989,710
SELECTING AND PRINTING MECHANISM
Filed Jan. 14, 1933  8 Sheets-Sheet 5
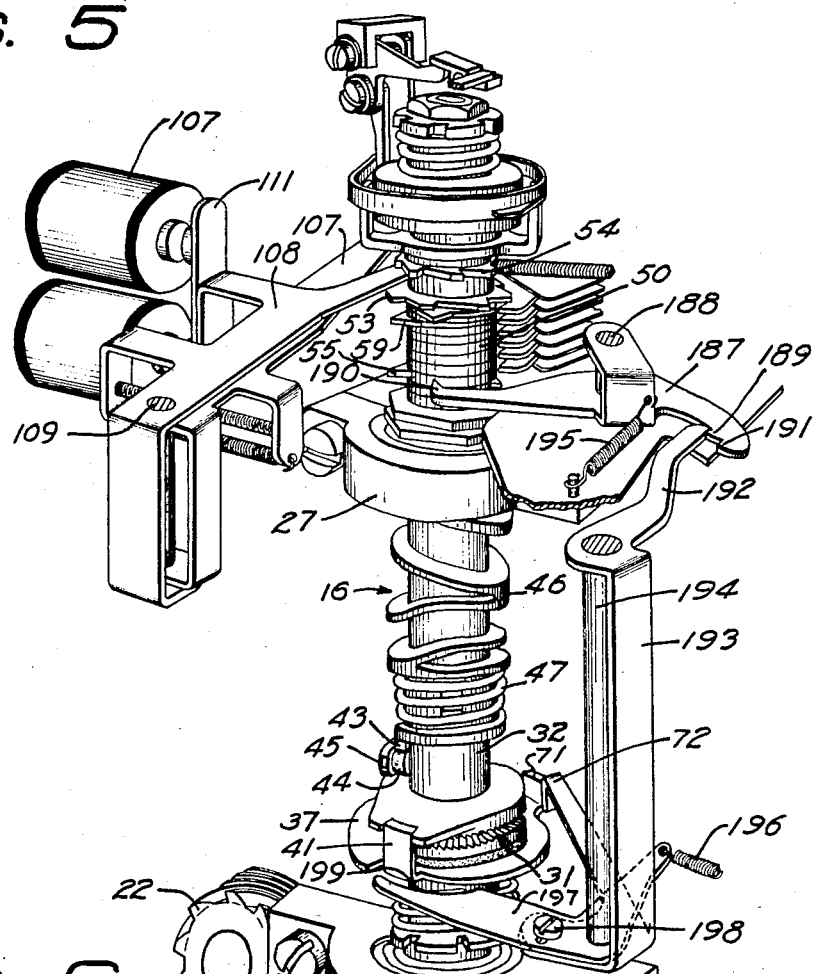
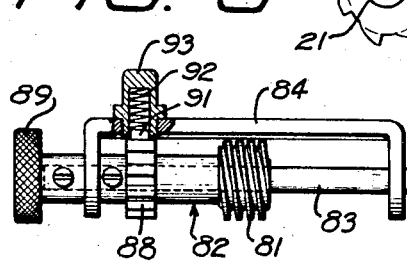
| ATT | AAC | UN | X | Z | HR |
|---|---|---|---|---|---|
| 4.108⅞ 3.¾ | 2.74⅞ | 1.24½ | 1.42¾ | 3.35½ | |
INVENTORS
ALBERT H. REIBER
WALTER J. ZENNER
BY
*H. B. Whitfield*
ATTORNEY

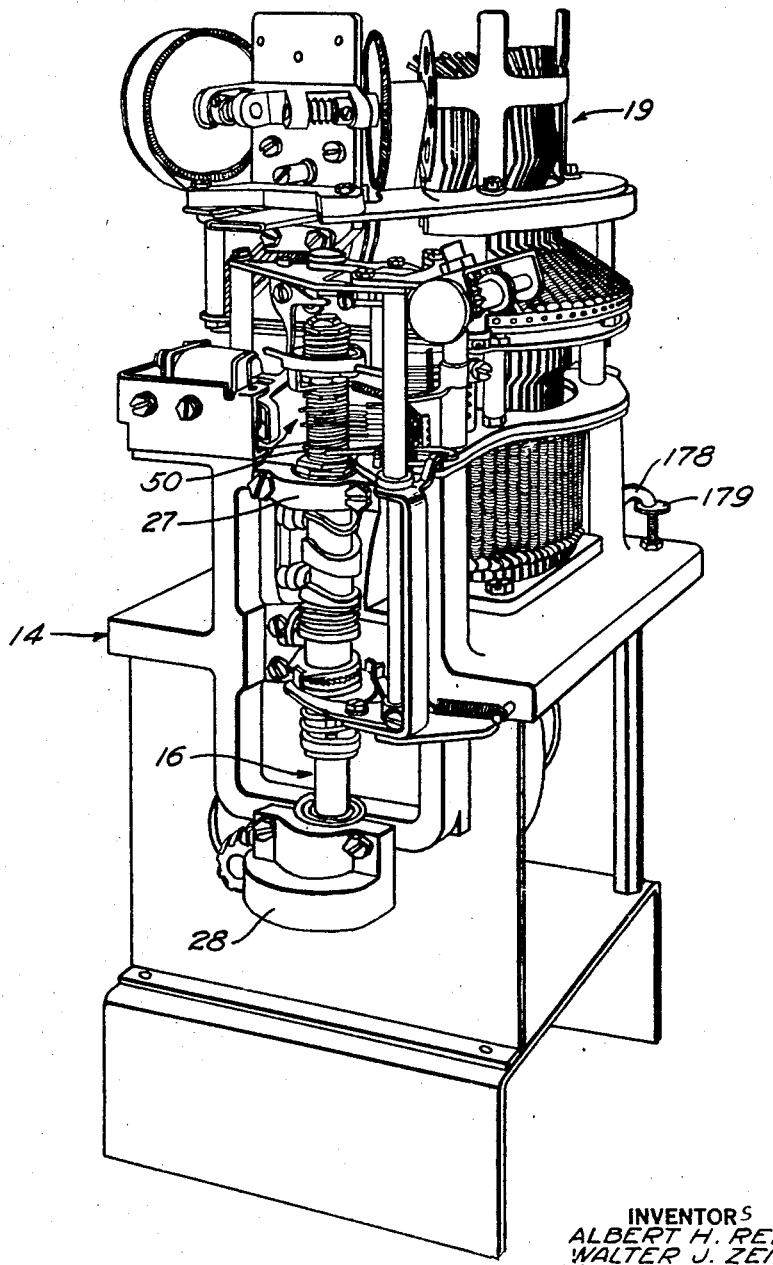

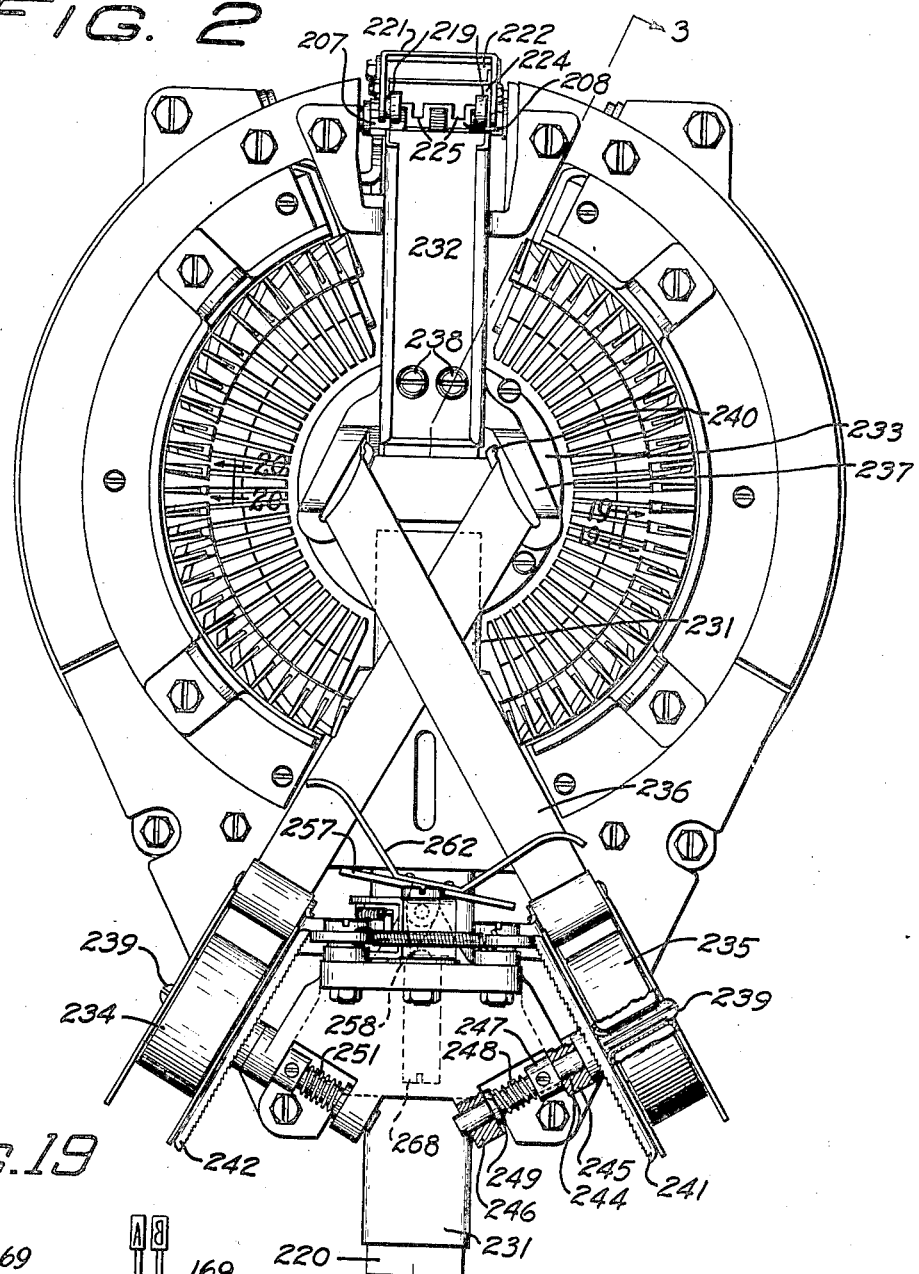
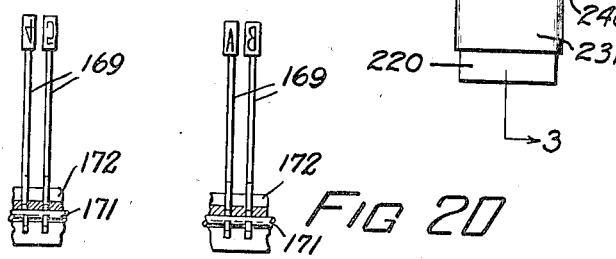

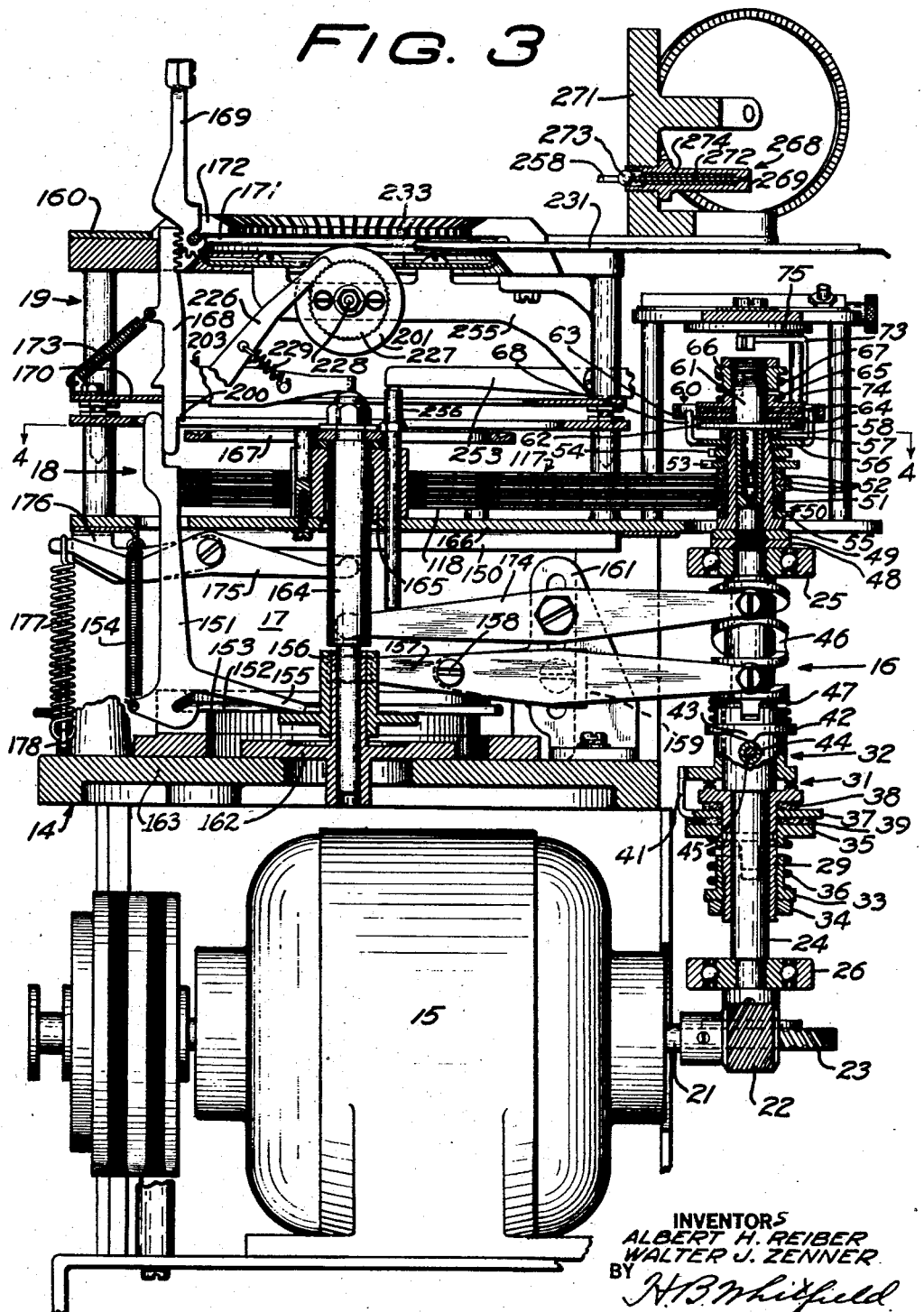

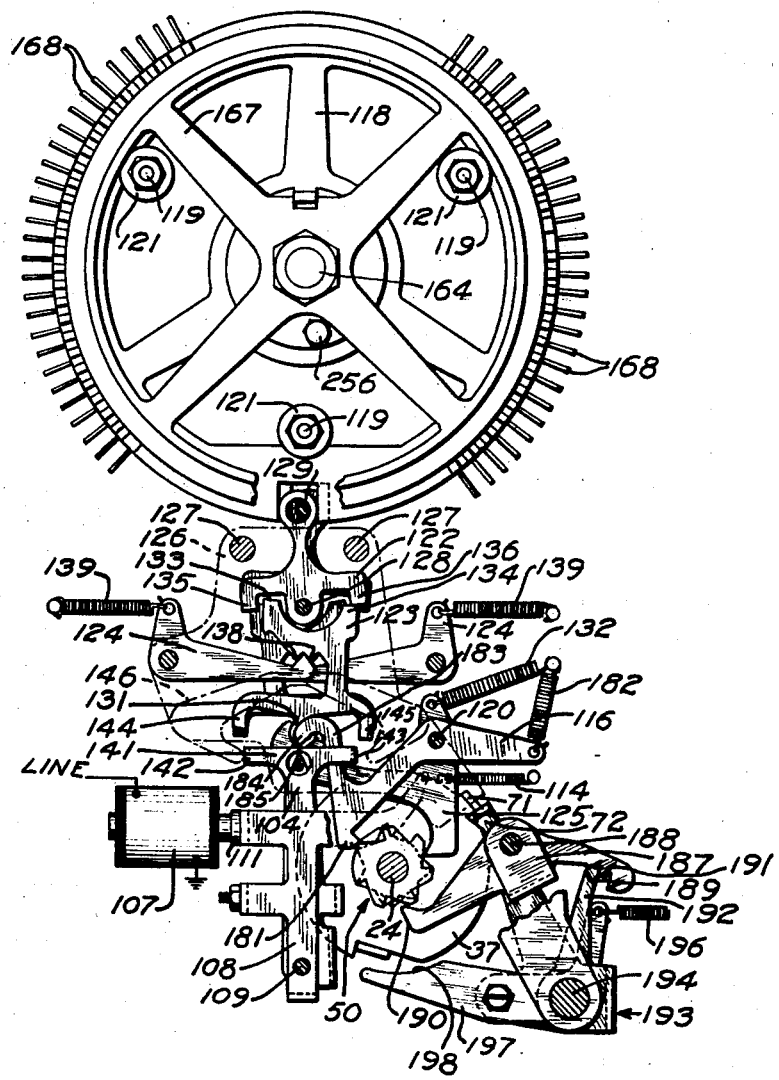

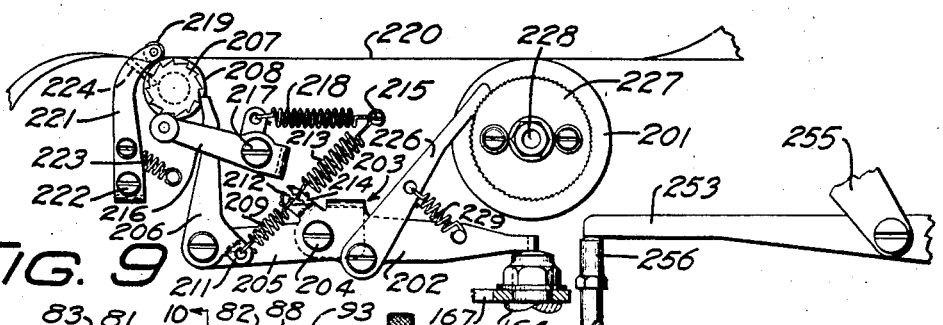
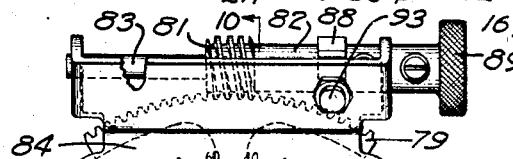
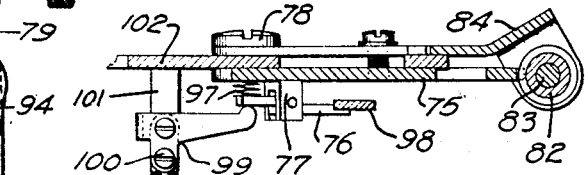
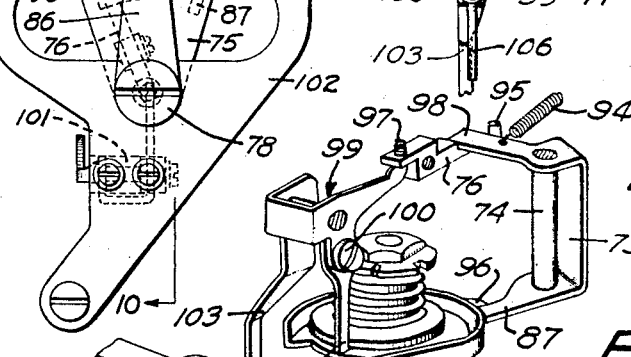
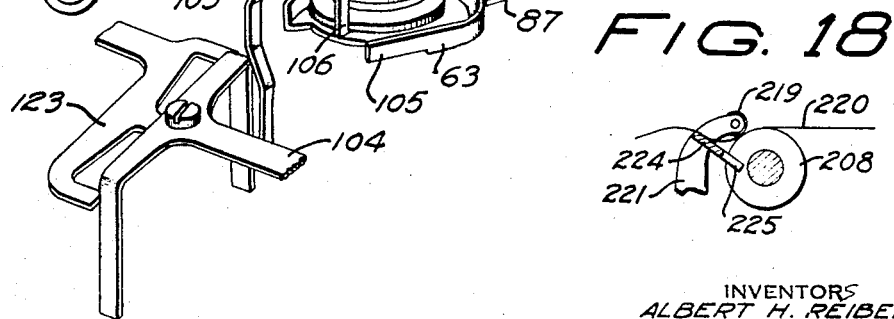

Feb. 5, 1935. A. H. REIBER ET AL 1,989,710
SELECTING AND PRINTING MECHANISM
Filed Jan. 14, 1933    8 Sheets-Sheet 7

INVENTORS
ALBERT H. REIBER
WALTER J. ZENNER
BY
ATTORNEY

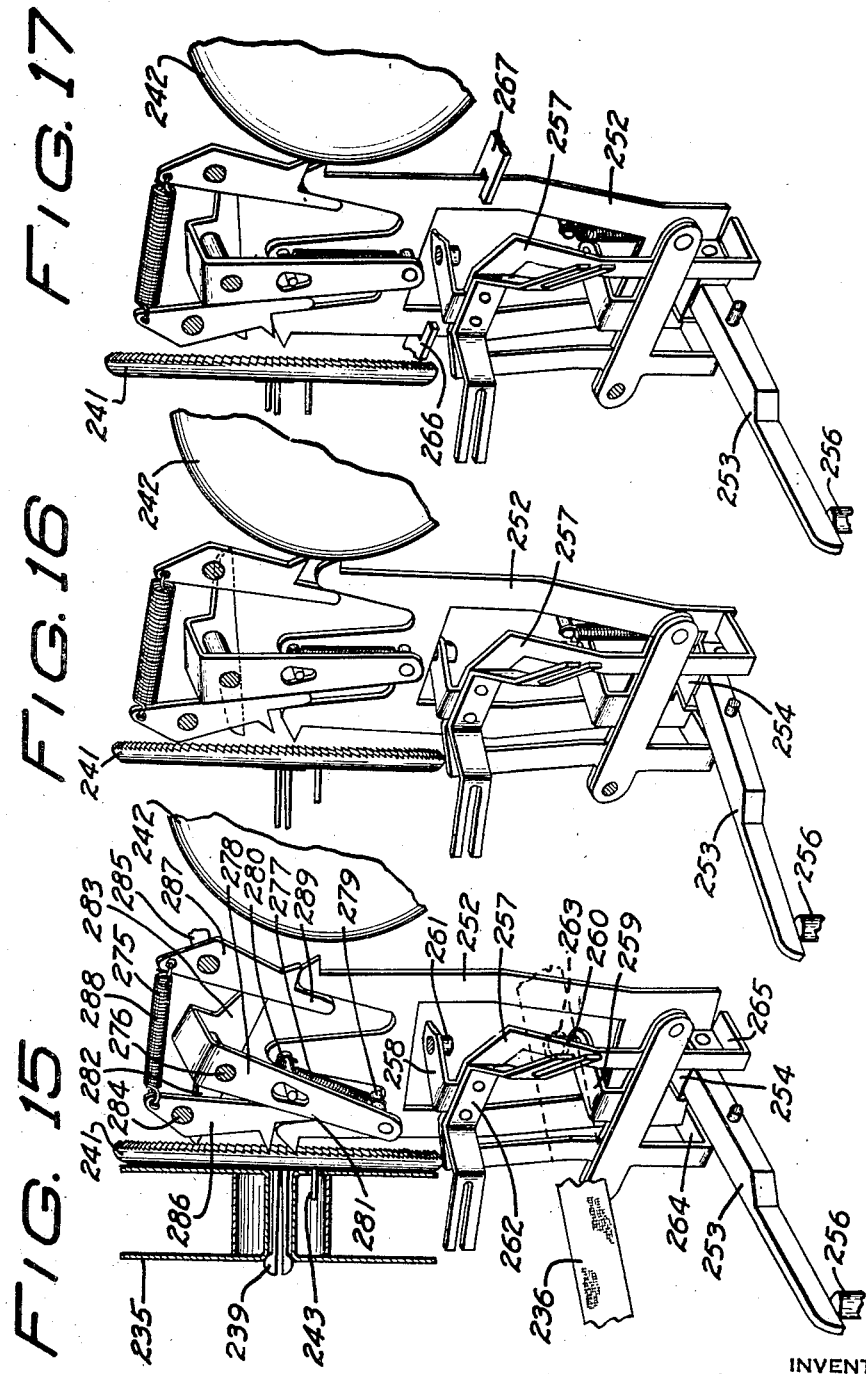

Patented Feb. 5, 1935

1,989,710

UNITED STATES PATENT OFFICE 1,989,710

SELECTING AND PRINTING MECHANISM

Albert H. Reiber, Chicago, and Walter J. Zenner, Des Plaines, Ill., assignors to Teletype Corporation, Chicago, Ill., a corporation of Delaware Application January 14, 1933, Serial No. 651,664

44 Claims. (Cl. 178—33)

This invention relates to printing telegraph apparatus and more particularly to an improved type of printing telegraph receiving apparatus wherein the characters are printed on a tape.

The primary object of the present invention is to provide in a printing telegraph apparatus a combination of overlap mechanisms which with mechanical refinements of parts for the reduction of movements thereof and the provision of positive drives therefor results in an apparatus capable of exceptionally high speed operation.

One of the principal objects of this invention is to provide a single magnet telegraph tape receiver wherein all characters have their own individual code selection which results in a considerable saving in line time and provides a decidedly simplified structure.

Another object is the provision of a printing telegraph machine wherein the relative arrangement of the several parts or units comprising it makes possible the segregation of the heat generating parts and noise producing parts of the printer.

The above and other objects of the invention are accomplished by the provision of a printing telegraph receiver comprising a six unit code disc selector mechanism of the latch type, in which the code discs are arranged in superposed horizontal planes. The code discs are permutably set by a selector mechanism embodying both a codal and an intervallic overlap, which permit of considerably higher speed of recording, as the recording or printing of the preceding character occurs during the period a group of code impulses for a succeeding character selection is being printed; and the reception of a succeeding impulse of a group of code impulses occurs during the selective conditioning of the preceding impulse of the same group of impulses which are referred to herein as codal and intervallic overlaps respectively. The latter overlap possesses the outstanding advantages of conserving line time by reducing the duration of individual impulse intervals and by the material reduction of the strength of the line current. Specifically, the selector mechanism, which is similar to that disclosed in S. Morton et al. Patent No. 1,745,633 of February 4, 1930, is operatively positioned to one side of the code discs, and embodies a single selector electromagnet directly responsive to line current impulses.

Directly above the code discs and concentrically disposed therewith are the actuating bars, striker disc and type bars. Printing or recording by the type bars is effected upon a tape through the use of an inking ribbon which extends transversely of the tape at the printing point, the printing zone being located centrally of the circularly arranged type bars. In the specific embodiment disclosed, the type bars are divided into two substantially semicircular groups disposed one on each side of the directional movement of the tape, and the type on each type bar is positioned so as to print on either the near or the far side of the tape to effect offset printing characteristic of stock quotation operation. However, single line printing can be produced, if desired, by properly positioning the type faces on the type bars.

Located below the aforementioned mechanism and separated therefrom by a solid partition is the motor and other heat generating elements commonly employed in printing telegraph machines. Juxtapositioned to these elements and operatively connected to the motor and the printing apparatus is the main operating shaft assembly which is disposed vertically. It is contemplated to enclose this self-contained printing machine in a suitable housing or casing.

Many features included in the disclosure of the present application are also disclosed in the following copending applications filed on September 9, 1933; namely, Serial No. 688,711 filed by H. L. Krum, Serial No. 688,713, filed by W. J. Zenner, Serial No. 688,726, filed by C. W. Swan, and Serial No. 688,730, filed by E. W. F. Hanke et al.

A better understanding of the invention may be had from the following description, taken in conjunction with the accompanying drawings, wherein:

Fig. 1 is a perspective view of the printing telegraph apparatus according to the present invention;

Fig. 2 is a plan view of the apparatus;

Fig. 3 is a vertical cross-sectional view of the apparatus taken on line 3—3 of Fig. 2;

Fig. 4 is a transverse cross-sectional view taken substantially on line 4—4 of Fig. 3;

Fig. 5 is a perspective view of the main operating shaft assembly together with certain related parts;

Fig. 6 is a front view of the positive orientation control device;

Fig. 7 is a representation of a portion of tape printed with the apparatus according to the present invention;

Fig. 8 is a view illustrating the tape feed mechanism of the apparatus;

Fig. 9 is a plan view of the positive orientation control device;

Fig. 10 is a sectional view taken on line 10—10 of Fig. 9;

Fig. 11 is a perspective view of the selector shaft release means;

Figs. 14, 15, 16 and 17 are views representing details of the ribbon reverse mechanism according to the present invention;

Figure 12:
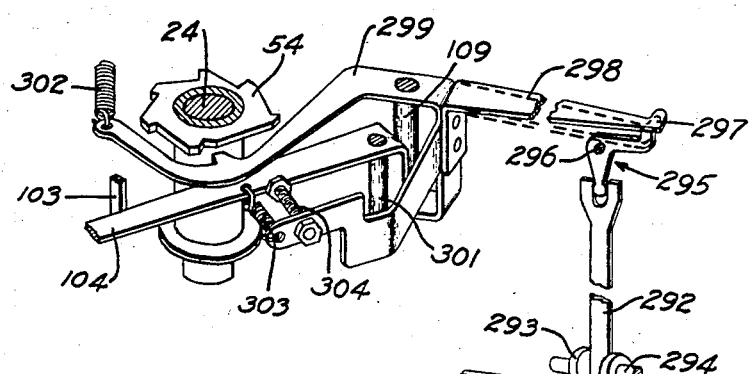
Fig. 12 is a perspective view of an alternate arrangement of selector magnet.

Fig. 18 is a cross-sectional view through a part of the tape feed mechanism showing the means for eliminating tape noise; and Figs. 19 and 20 are sectional views taken on lines 19—19 and 20—20 respectively of Fig. 2.

Referring to the drawings wherein like reference characters indicate the same part throughout the several views and more particularly to Figs. 1 and 3, there is shown a main supporting frame generally indicated by the numeral 14 which carries in its lower compartment a motor 15 which is separated from the other parts of the apparatus superposed thereabove by a solid partition, thus effecting the segregation of the heat generating part of the apparatus. Frame 14 also carries the parts or units; namely, the main shaft assembly, the operating mechanism, the selector mechanism, and the typing unit, generally indicated by the numerals 16, 17, 18 and 19, respectively, all of which are arranged vertically so as to produce a compact, self-contained apparatus. The typing unit 19, which also carries the ribbon feed mechanism and the tape feed mechanism, is, by means of dowels 20 which fit into drilled holes in the main frame 14, detachably mountable on frame 14 so that it may be readily interchangeable, if desired, with a typing unit specially designed for projection purposes. To shaft 21 of motor 15 is secured a worm pinion 22 which is adapted to mesh with worm gear 23 secured to the lower extremity of a vertically disposed main operating shaft 24. Shaft 24 is carried by anti-friction bearings 25 and 26 which are mounted in brackets 27 and 28, secured to frame 14. Pinned to shaft 24 immediately above bearing 26 is a sleeve 29 which terminates at its upper end in a flange the upper face of which is provided with teeth which form a part of a toothed or grab clutch 31, the companion teeth of the clutch being formed on the flange of a sleeve member 32. The lower portion of sleeve 29 is threaded to receive a capstan nut 33 and a locknut 34. Immediately above the capstan nut 33 and slidably articulated thereto by means of a pair of diametrically opposed tongue and groove connections is a flange member 35. Between the members 33 and 35 is a helical compression spring 36 which forms part of a friction clutch comprising a drive disc 37 and a pair of friction discs 38 and 39. By means of the compressive action of spring 36 the members 37, 38 and 39 are compressed between the flange of sleeve 29 and flange 35. Disc 37 has a lug 41 adapted to cooperate with a slot in the flange on sleeve 32 to effect a driving connection therewith. Sleeve member 32 is also provided with a flange 42 integral to which is a cam portion 43 which coacts with a cam follower roller 44 mounted on a stud shaft 45 secured to the frame of the apparatus. Loosely mounted on shaft 24 and disposed between the sleeve member 32 and the anti-friction bearing 25 is a multi-cam member 46 which has cam grooves to control the printing, tape feed, ribbon feed and selector bar restoration functions of the apparatus. Member 46 is provided at its lower extremity with a pair of tongues cooperable with corresponding grooves in sleeve member 32 and thus is adapted to rotate therewith. A helical compression spring 47 is interposed between the cam member 46 and flange 42 to effect upon the disengagement of cam portion 43 and roller 44 the engagement of clutch 31.

Shaft 24 is adapted to extend above the bearing 25 and carries thereon a selector cam assembly and related elements and is secured to the inner ring of the bearing 25 by means of a nut 48 and locknut 49. The selector cam assembly 50 comprises a flanged sleeve member 51 which is loosely mounted on shaft 24, and carried on the sleeve member 51 are a series of cam discs 52 arranged in laminated formation and provided with cam portions 59 (Fig. 5) which are helically disposed so as to effect upon rotation of the selector cam assembly the operation of a series of selector members successively. Sleeve 51 also carries a locking cam disc 53, a flutter cam disc 54, a release cam disc 55 and a drive disc 56. All of these cam discs are held in their predetermined cooperative relation by means of a nut 57 and a locknut 58. Threaded into the upper end of shaft 24 and adapted to rotate therewith is a member 61 which is provided with a flange 62 which forms part of a friction clutch 60 comprising drive disc 63, discs of friction material 64 and a disc 65 which is operatively connected by means of tongue and groove connections to a capstan nut 66 threaded and locked on the upper end of member 61. Compressed between flange 65 and the flange on nut 66 is a helical compression spring 67 which renders friction clutch 60 effective. Disc 63 and disc 56 are operatively connected to each other by means of a pair of diametrically opposed lugs 68.

Shaft 24 rotates continuously and carries with it sleeve 29 and its associated parts except disc 37 which is held from rotation by the coaction of lug 71 on disc 37 and lever arm 72, as indicated in Fig. 5. Also, constantly rotating with shaft 24 is the member 61 and its associated parts except disc member 63 which is held from rotation by a stop gate 73 (Fig. 11). Thus, it is seen that the selector cam assembly 50 is driven by the shaft 24 through the medium of friction clutch 60 which is rendered effective by the pressure of spring 67.

Stop gate 73 is mounted upon a pivot stud 74 secured to an adjustable plate 75 (Figs. 3, 9 and 10), and its upper arm is adapted to be engaged by a latch 76. The latch 76 is pivoted in a journal block 77 (Fig. 10), and this journal block is in turn mounted on the adjusting plate 75. Plate 75 may be rotated about a pivot stud 78 by means of a positive orientation control device, shown in Figs. 6, 9 and 10. As shown in Fig. 9, the adjusting plate 75 is provided with a segmental gear portion 79 which is adapted to cooperate with a pinion 81 which is integral with sleeve 82 mounted on a shaft 83 suitably carried by the orientation member 84, which has graduations 85 adapted to cooperate with an indicating arm 86 mounted on pivot 78.

As seen in Fig. 9, both the latch 76 and stop gate 73 are carried on the adjusting plate 75 and are movable therewith. By means of this orientation adjustment the position of arm 87 of stop gate 73 may be altered, as will be presently made clear, to obtain the best operating conditions of the selector. Integral with sleeve 82 is a star wheel 88, as shown in Figs. 6 and 9, the sleeve 82 being pinned to the shaft 83 for rotation therewith. Also fixed to an extended portion of shaft 83 is the knurled thumb piece 89 through which the rotation of shaft 83 is effected. Thus, it is manifest that the adjusting plate 75 may be rotated within predetermined limits about its pivot 78 through the cooperation of gear portion 79 and worm 81. Star wheel 88, as indicated in Fig. 6, cooperates with a detent member comprising a ball 91, or the like, responsive to the action of a compression spring 92 contained in a cap member 93 mounted on the orientation plate 84, through which means the orientation adjustment is maintained.

A spring 94 extending from the gate 73, Fig. 11, to a spring post on plate 75 tends to rotate the gate clockwise, as viewed in Fig. 11, against an eccentric stop member 95. The disc 63 tends to rotate the stop gate 73 in a reverse direction through the coaction of a lug 96 integral with member 63 and arm 87 of gate 73, but the latch 76 restrains the gate 73 against actuation by the stop lug 96. The pivot stud 78 and the left end of latch 76, as viewed in Fig. 10, are in alignment with the axis of the shaft 24. A spring 97 compressed between one end of latch 76 and adjusting plate 75 normally holds the opposite end of the latch in position to engage the upper arm 98 of the stop gate 73. A trip member in the form of a bell crank 99 is pivoted on an adjustable bracket 101 (Fig. 10) mounted on the fixed plate 102 of the orientation device so that the extremity of its horizontal arm may engage one arm of the latch 76 at a point coincident with the coaxial alignment of the shaft 24 and the pivot stud 78. The depending arm 103 of the bell crank member 99 is adapted to cooperate at its extremity with a selector lever 104 such that when the lever 104 responds to a spacing impulse the bell crank member 99 will be rotated slightly in a counterclockwise direction, as viewed in Fig. 11, to impart in turn clockwise rotation to latch 76 against the action of spring 97 such that the latch 76 is disengaged from the arm 98 of stop gate 73 whereupon gate 73 is free to respond to the push of stop lug 96 and is thereupon rotated slightly in a counterclockwise direction against the action of its spring 94, it being remembered that the disc member 63 which carries lug 96 constantly tends to rotate with shaft 24 through the medium of friction clutch 60. After the lug 96 has passed arm 87 the stop gate 73 is free to return to its clockwise position under the influence of spring 94 against stop 95 to be re-engaged by latch 76. Incidentally, latch 76 and stop gate arm 98 are so designed as to limit the counterclockwise rotation of stop gate 73 to insure that arm 98 and latch 76 will always be in proper cooperative relation with each other.

Normally, bell crank member 99 would vibrate in response to the selective vibrations of selector lever 104 and would cause a corresponding rocking of latch 76, but according to the present invention this vibration has been eliminated by providing a flange 105 integral with the drive disc 63 which is adapted to cooperate with a second depending arm 106 adjustably secured to bell crank member 99 through the instrumentality of slot and screw adjustment 100. Thus, as will be clearly apparent hereinafter, the bell crank 99 after responding to the first impulse of the received code combination to release the latch 76 to effect the rotation of disc 63 will by the cooperation of flange 105 and arm 106 be held against further action or vibration by selector arm 104 until near the termination of the cyclic movement of disc 63 when latch 76 is again restored to its operative position and lug 96 will again engage arm 87.

Having reference now to Fig. 4, the details of the selector mechanism actuated by the aforementioned selector cam assembly 50 will be described. The selector cam assembly 50 is rotated at a speed substantially equivalent to the speed of code pulsing and operating in conjunction therewith is a selector magnet 107 which may be connected either directly or indirectly to the signal line. According to the present invention the selector lever 104 is not operated directly by the selector magnet 107 but is resiliently connected to a flutter lever 108 which may or may not be mounted with lever 104 on a common pivot 109; an alternate method of mounting the levers analogous to levers 104 and 108 on individual pivots being shown in Fig. 12. The armature 111 for the magnet 107 is carried by the flutter lever 108, as indicated in Figs. 4, 5 and 13.

Operating in conjunction with the selector magnet 107 is a mechanical means for periodically vibrating the armature 111, which means, consists of a flutter cam 54 (Figs. 5 and 13) operative in synchronism with the selector cam assembly 50, which cam 54 is arranged to vibrate the armature in timed relation with respect to the incoming signals. Consequently, with this type of selector mechanism it is only necessary to impress on the winding of the selector magnet 107 sufficient current to seize the armature magnetically once it has been moved thereto and to retain it in its set position pending a subsequent line signal. As more clearly shown in Fig. 13, the selector arm 104 is resiliently connected to the flutter lever 108 through a spring 112 and an adjustable screw 113. The armature 111 through flutter lever 108 is normally under the tension of a spring 114, and when lever 108 is moved by the coaction of cam 54 and cam portion 115 the selector arm 104 also tends to move therewith by virtue of the spring connection therebetween. Thus, if the selector magnet 107 is energized at the time the armature is brought into close proximity thereto, the armature and the selector arm will be retained in their actuated position. However, if no current is then flowing through the winding of the selector magnet 107, the armature and the selector arm will be restored to their released position through the action of the restoring spring 114 to the spacing or unactuated position. In effect, however, when the selector arm 104 is in the marking or actuated position, the armature 111 of the selector magnet, due to the momentary mechanical locking of the selector arm, as will hereinafter appear, will be retained against the action of its restoring spring 114 in an actuated position, but when the selector arm is released by the locking lever 116 (Fig. 4) the armature as well as the selector arm will be returned to the spacing or released position. Consequently, by the resilient interconnection between the armature or flutter lever 108, the selector mechanism is arranged with an overlap precluding the absolute necessity of having the selector arm 104 operated in accurate timed relation to the periodic movement of the armature of the selector magnet.

Referring to Fig. 3, the selector cam assembly 50 is shown as cooperating with a group of selector elements 117 and a series of code discs 118, detailed illustration of which is shown in Fig. 4. As previously described, the code discs 118 are arranged in superposed horizontal planes and are mounted for limited rotation on studs 119 and are held in spaced relation by washers 121 mounted on said studs. In the specific embodiment herein described the code discs are provided with spokes but may obviously be formed from solid discs, if desired.

The transfer mechanism between the six code discs 118 and the selector arm 104 comprises six sets of selector elements, each set comprising a T-lever 122, Fig. 4, a selector member or interponent 123, detents 124 and bell crank levers 125, each set being composed of thin, flat material and arranged in superposed relation between guide plates 126 which are mounted on studs 127 and spaced by washers (not shown).

As is commonly known, the peripheries of the code disc are notched so that each permutation of the six discs will result in an alignment of notches to permit the entrance of a selector or drop bar therein. The T-levers 122 are mounted on a common pivot 128 and each one is provided at the extremity of its stem portion with a substantially circular head to fit snugly in a notch in its associated code disc so that the oscillation of a T-lever 122 will effect a corresponding reciprocation of its code disc. Each T-lever 122 is provided in said head portion with a hole substantially larger than a common guide rod or stop post 129 so that the limited movement of the T-lever and code discs may be predetermined. The interponents 123 are provided with circular portions 131, Fig. 13, adapted to engage corresponding sockets in their associated bell crank levers 125. Individual springs 132 normally hold the bell crank levers 125 and interponents 123 in the position shown in Fig. 4 with one or the other of the abutments 133 and 134 in contact with their cooperating abutments 135 and 136 of T-lever 122. Springs 132 are also effective to hold their corresponding bell crank levers 125 in contact with the selector cam assembly 50.

As previously mentioned, the selector cam assembly 50 is provided with a helically arranged series of cams 59, one for each of the bell crank levers 125, which rotate the bell crank levers 125 (six in the present instance) in succession and thus reciprocate the interponents 123 as the selector cam assembly 50 is rotated. In addition to the reciprocal movement the interponents have a lateral swinging movement between the detent notches 138 which cooperate with detents 124 which are actuated by their individual springs 139.

The setting of an interponent 123 to its right hand or its left hand position is determined by the position of selector lever 104 which in turn is determined by the nature of the signal impulse, whether marking or spacing, received by the selector magnet 107. Selector lever 104 terminates in a U-shaped portion 141, having downwardly extending arms 142 and 143 (Figs. 4 and 13) which constitute abutments which cooperate with abutments 144 and 145 of the interponent 123 and function to position the interponent 123 in either its right hand or left hand position, as will presently appear. As previously mentioned, each spring 132 associated with a bell crank lever 125 normally holds the associated interponent 123 in its forward position and in engagement with its associated T-lever 122, and each code disc 118 thus is held in either one or the other of its two selecting positions according to the position of the associated interponent 123.

As the signal impulses are received the selector magnet 107, which in the present embodiment is shown connected directly in the line circuit, responds to only one of the two different electrical conditions comprising the signals and seizes its armature 111, after it has been mechanically assisted to close proximity thereto, when a marking impulse is received and releases it again when a spacing signal is received, while the interponents 123 are reciprocated successively in synchronism with the received signals by the action of selector cams 59 of the cam barrel assembly 50 upon the bell crank levers 125. The abutments 144 and 145 are thereby brought into cooperative relation with the arms 142 or 143 at the corresponding signal intervals, thereupon setting the interponents 123 in variant combinations. In order to insure the alignment of abutments 142 and 143 in their respective cooperative positions a limiting stop 146 is provided.

In the present structure the interponents 123, which are analogous in general selective function to the so-called fingers of the mechanism disclosed in the previously noted Morton et al. Patent No. 1,745,633, are especially designed to render them conducive to high speed operation, in that the pair of abutments 133 and 134 of the interponents 123 are substituted for the single swingable abutment of said fingers. The advantages of this construction reside in the reduction to a minimum of the time required to operate the interponents to effect the selections, and the quickening of the cam action of cams 59 on bell crank levers 125, whereby cams 59 may be made much smaller in size.

In order that the selector magnet 107 may operate upon a minimum of current, means is provided to assist the armature 111 to its actuated position, which means comprises a multi-cam disc or flutter cam 54 secured to the selector cam assembly 50 which cooperates with the follower portion 115 integral with the flutter lever 108 (Fig. 13). As previously mentioned, the spring 114 secured to one extremity of the flutter lever 108 tends to urge the follower 115 into cooperation with the cam 54. Since the normal stop condition of the signal line is marking, the selector magnet 107 during the idle periods in the use of the apparatus remains energized and, hence, the armature 111 is normally attracted, and follower 115 is held out of cooperative engagement with cam 54 against the action of spring 114. In the specific embodiment herein disclosed the selector mechanism is operated on the start-stop principle and in response to a six-unit permutation code, in which event, the cam discs 52 are six in number, one for each signal, and the cam portions of the flutter cam 54 are seven in number, one for each signal of the intelligence code and one for the stop signal. When the selector cam assembly 50 rotates, the coaction of the cam portions of cam 54 with the follower 115 effects the oscillation of armature 104 through the instrumentality of the flutter lever 108 and the resilient connection therebetween and thus moves the armature 111 by mechanical power into its operative position near or against the selector magnet 107 in timed relation to the speed of code pulsing.

As shown in Fig. 13, the selector lever 104 is not integrally formed with the flutter lever 108 and armature 111, but is operatively connected therewith through a spring 112 and an adjustable screw 113 carried on an extension 147 of the flutter lever 108. The levers 104 and 108 being so connected are enabled to move as a unit, the spring 112 functioning normally to hold lever 104 against the stop screw 113. However, lever 108 is free to respond to the camming action of cam 54 despite lever 104 if lever 104 should, as will hereinafter appear, be restrained momentarily by locking lever 116 (Fig. 4), whereupon spring 112 will be distended and as soon as the restraint upon lever 104 has been removed it will instantly be drawn against the stop 113 by the spring 112. The purpose of this flexible connection between flutter lever 108 and selector lever 104 is to compensate for the difference in operation between the accurately timed operation of the flutter lever 108 and the slower mechanical operation of selector lever 104 by providing an intervallic overlap; that is, an overlap of the signal intervals of a code and the mechanical operations pursuant thereto, whereby a preceding code impulse causes the operation of signalling restoring devices which continue action after the termination of the preceding signal interval and which extend action into the succeeding contiguous signal interval.

When the flutter lever 108 is actuated by one of the cam portions on the flutter cam 54 to bring armature 111 into proximity with selector magnet 107, and if at that instant selector magnet 107 is energized by a selecting impulse, lever 108 will be held in this actuated position during the time interval of the signal impulse. This movement of flutter lever 108 is evidently imparted through spring 112 to selector lever 104 which movement will bring its right hand abutment 142 (Fig. 13) into alignment with the right hand abutment 144 of interponent 123. However, due to the intervallic overlap, selector lever 104 is held by the locking member 116 (Fig. 4) in its left hand position against the action of spring 112 to insure the effectuation of the preceding selecting operation; and flutter lever 108, due to the resilient connection afforded by spring 112 is permitted to operate in accurate timed relation to the speed of code impulsing and to respond to the next impulse despite the mechanical restraint imposed upon selector lever 104. Thus, when a substantial portion of the time interval of the next impulse has transpired, the locking restraint imposed by locking lever 116 will be removed and lever 104 will respond instantaneously to the action of spring 112. This overlap is, therefore, conducive to efficient operation and is accordingly highly desirable.

Having reference to Fig. 3, it will be noted that cooperating with the peripheries of code disc 118 are a series of selector or drop bars 151, only one of which is shown in Fig. 3. These bars are circularly arranged about the code disc 118 and are pivotally mounted upon a circular rod 152. The rod 152 is mounted in and the bars 151 are guided by a circular comb member 153. Each of the bars 151 is provided adjacent the pivotal points with a heel portion to which is secured one end of an individual spring 154, the other end of which is secured to a ring 150 attached to the frame of the machine. The springs 154 normally tend to rotate their respective bars 151 in a clockwise direction (as viewed in Fig. 3) into engagement with the code discs 118. Each of the bars 151 is provided with an arm 155 which cooperates with a selector bar restoring member 156. The member 156 is held normally in its upward position and thus through arm 155 maintains the bars 151 out of engagement with the code bars 118. Member 156 is connected to a lever 157 pivoted at 158 to an adjustable member 159 which is slidably mounted on a bracket 161. The opposite end of lever 157 is provided with a follower roller adapted to coact with one of the cam grooves in cam member 46. Thus, upon the cyclic operation of cam member 46 positive reciprocal movement in a vertical direction is imparted to member 156. Member 156 is also slidably mounted on a turret member 162 mounted on a base 163 and concentrically positioned with relation to the code discs 118.

Also slidably operable in the turret member 162 is the reduced lower end of a plunger 164, the upper end of which is guided in a block 165 mounted on a plate 166 and in coaxial alignment with turret member 162. Carried by the upper end of plunger 164 is a circular striker member 167 which is provided on its upper surface and along its circumference with a continuous V-shaped notch, and interposed between striker member 167 and an upward extension on bars 151 is a push bar 168, there being one push bar 168 individual to each selector bar 151. The upper end of push bar 168 is provided with a rack meshed with a segmental gear portion of a type bar 169 associated therewith. Type bars 169 are pivotally mounted on a circular rod 171 carried in a circular comb member 172. Bars 168 are guided by comb members 160 and 170 and are each provided with a spring 173 adapted to simultaneously impart thereto a downward and leftward movement (as viewed in Fig. 3). Each push bar 168 is provided with a notched portion adapted to engage with the V-shaped notch along the peripheral edge of the striker disc 167 when urged thereto by its associated selector bar 151.

Downward movement is imparted to plunger 164 by a lever 174, pivotally mounted on bracket 161, one end of which is adapted to operate in a groove in plunger 164, the other end of the lever 174 being provided with a follower roller adapted to coact with a cam groove in cam member 46. Upward movement is imparted to plunger 164 by a spring actuated lever 175 which is pivoted to a bracket 176 secured to plate 166. One end of lever 175 is adapted to operate on a shoulder in plunger 164 and the other end cooperates with a printing spring 177. The lower end of spring 177 is attached to one end of an adjusting lever 178, the other end of the lever 178 cooperating with an adjustable screw 179 (Figs. 1 and 3), which makes possible the variation of the printing blow.

Referring now to Figs. 1 to 5, 11 and 13, a description of the operation of the mechanism so far described will now be given. As previously mentioned, the normal stop condition of the line is marking, and hence the selector magnet 107 is normally energized. During the first line impulse or start interval which is of spacing nature, the selector magnet 107 is deenergized and the movement of the selector lever 104 will cause the bell crank 99 to rotate the latch 76 a slight amount to disengage said latch from arm 98 of stop gate 73 which is thereupon rotated in a counterclockwise direction, as viewed in Fig. 11, against the action of spring 94 by the pressure of the lug 96 against the arm 87. The cycle of operation of the selector cam assembly 50 thus is initiated, and as soon as the stop lug 96 passes the end of arm 87 of the gate 73, the gate will be rotated clockwise by its spring 94 against stop 95. A further oscillation of the bell crank 99 is prevented during the ensuing cycle of operation by the coaction of flange 105 and depending arm 106. Likewise, latch 76 is maintained in its disengaged position until at the termination of the cycle of operation, latch 76 will again resume its operative position to engage the stop gate arm 98. The parts are so constructed that the selector cam assembly 50 is stopped positively by the gate 73 at the end of each cycle and is readily released in response to the start impulse by the movement of the selector lever 104. In this manner the apparatus of the present invention is adapted to operate on the start-stop principle.

The cycle being started with proper orientation, that is, the arm 87 of stop gate 73 being properly positioned angularly with respect to the selector cam assembly 50 by means of the pinion 81 and gear portion 79 to place the selector cam assembly 50 in the most favorable position with respect to the received code impulses to properly operate the selecting mechanism, the first cam projection on the flutter cam 54 engages the cam follower 115 on the flutter lever 108 (Fig. 13) to rock said lever counterclockwise, thus moving the selector lever 104 against or in close proximity to the selector magnet 107; thereafter the cam projection passes the follower 115 and releases the lever 108. But, should the line condition be of marking nature; that is, if marking current is impressed on the signal line, the selector magnet 107 will be energized at the time a projection on cam 54 leaves the follower 115 and in consequence thereof the armature 111 will be seized by the selector magnet 107. In this connection it is to be noted that even though the selector magnet be energized by the line current to a degree insufficient to attract the armature and its associated flutter lever from its position against the cam 54, nevertheless, due to the assistance rendered to the armature and its associated parts by the cam 54, the equivalent effect is obtained. In other words, the armature being thus mechanically assisted to its attracted position will be there held by the selector magnet 107 even though the selector magnet 107 be energized to a degree which would have been insufficient to attract the armature initially from its released position. When the signal impulse is of spacing nature the selector magnet 107 will not be energized and, of course, the armature will in that case merely be oscillated by the cam 54 into close proximity to the selector magnet and returned immediately by the action of spring 114.

Assuming that the first impulse after the starting impulse is of marking nature, the armature 111 and associated flutter lever 108 will be held in their counterclockwise positions (shown in Fig. 4) and the selector lever 104 being at this point in the cycle free to move is correspondingly actuated through its flexible connection with flutter lever 108. While the selector lever 104 is in this position a locking lever 116 (Fig. 4) operates to lock it in such position until the first cam of the helical series of cams 59 on the selector cam assembly 50 has actuated its associated bell crank lever 125 in a counterclockwise direction (as viewed in Fig. 4) to move the first interponent 123 to its marking position. This movement of interponent 123 to its marking position (indicated in Fig. 4) is effected when interponent 123 is caused to rotate about its ball portion 131 by the coaction of abutments 142 and 144 and the downward pull exerted on ball portion 131 by the bell crank 125. Interponent 123, when subsequently actuated in a reverse direction by spring 132 through bell crank 125, rocks, through the cooperation of abutments 134 and 136, the associated T-lever 122 to its counterclockwise position to in turn urge its associated code disc 118 to its corresponding clockwise position.

Had the first impulse condition after starting been of spacing nature the armature lever 111 and flutter lever 108 would not have been held by the selector magnet 107, but instead the lever 108 would have assumed the position with cam follower 115 in engagement with cam 54. In their angular arrangement the cam projections of the locking cam 53 in their operative effect follow the corresponding projections on the flutter cam 54 by a very brief interval, yet of sufficient duration to permit the spring 114 to rock the flutter lever 108 to its spacing or released position (that is, against the cam 54) before the locking of lever 104 takes effect. Accordingly, if the first impulse condition after starting had been of spacing nature to thus deenergize selector magnet 107, the spring 114 would have rocked the flutter lever 108 to its spacing position against the cam 54 before locking lever 116 became effective, and then the first selector cam 59 would have rocked the first bell crank lever 125 to move its first interponent 123 to its spacing or right hand position (as viewed in Fig. 4).

Just prior to the reception of the succeeding signal impulse the next cam projection on cam 54 will oscillate lever 108 to again bring armature 111 into close proximity to selector magnet 107 and in the event that this impulse is of marking nature the armature will be held in its attracted position to effect a result similar to that described in connection with the first marking impulse. Also, should this impulse be of spacing nature instead, the same effect as that described in connection with a first impulse of spacing nature will result.

The operation of the selector mechanism pursuant to the reception of each of the succeeding impulses, including the stop impulse condition of marking nature, is similar to that just described. The cam 54 is provided with six operating projections to operate flutter lever 108 in accordance with the six selecting impulse conditions and is provided further with a seventh projection for operating the flutter lever 108 preparatory to the receipt of the stop impulse which is always of marking nature, in which event the armature will be urged into close proximity to the selector magnet 107 and there held by the magnet until a starting (spacing) impulse is received.

Normally, to provide a wide margin of operation, the setting of the interponents 123 should be selected or determined at definite points or very brief intervals uniformly spaced throughout the selecting cycle, so that such points may register with the mid-portions of the intervals of the received signals or code combinations. It is difficult, however, to so construct the parts of a mechanical selector as to effect such an operation and particularly where, as is highly desirable in order to permit rapid operation, the parts are of light weight construction and the vibratory movement of the selector lever is slight. Therefore, to insure a wide margin of operation, a means, as shown in Fig. 4, is employed for intermittently locking the vibrating selector lever 107 in one or the other of its selecting positions, such locking occurring at definitely spaced points or instants in the selecting cycle, which points are slightly in advance of the time intervals or portions of the cycle during which the setting of the interponents 123 is effected.

The locking device, shown in Fig. 4, comprises a lever 116 pivoted on the shaft 120 and arranged between the two uppermost guide plates 126. The locking lever 116 is provided with a nose or shoulder 181, and a spring 182 connected to one arm of said lever holds the shoulder 181 in engagement with the periphery of the cam 53 which forms a part of and rotates with the selector cam assembly 50. Cam 53, as indicated in Fig. 4, is set angularly, as previously mentioned, relative to cam 54 to effect the proper timed operation of lever 116 and flutter lever 108 and is provided with a series of cam projections or shoulders, six in the present instance, which successively vibrate the arm 183 during each operating cycle which, as has been noted, corresponds to one complete rotation of the selector cam assembly 50. The end of the arm 183 of lever 116 is provided with a locking dog or knife-edge 184 which cooperates with a knife-edge 185 fixed to the extremity of selector lever 104. Whenever the nose 181 of the locking arm 116 coacts with the high portions of cam 53, the knife-edge 184 is held thereby slightly out of the path of the movement of the cooperating knife-edge 185 of the selecting lever 104, but when the nose 181 passes over the substantially radial shoulders of said cam portions, the knife-edge 184 will engage knife-edge 185 on either one or the other side thereof and hold the selector lever 104 in either its right hand or left hand position.

The number of cam projections on the cam 53 corresponds to the number of selecting intervals of each code combination and they are so spaced angularly that one of the projections embraces approximately two-sevenths and each of the other projections embrace approximately one-seventh of the circumference of the cam, representative of the six selecting intervals and the stop interval. Also, the cam projections on the cam 53 are so spaced angularly with respect to the selector cams 52 such that the locking arm 116 is quickly shifted into engagement with the selector lever 104 by the spring 182 at definite instants in each revolution or setting cycle of the selector cam assembly 51, and which instants are so chosen that the selector lever 104 is locked in one or the other of its selective positions just before any engagement of the abutments 144 or 145 with their cooperating abutments 142 and 143 occurs, so that the setting of the respective interponents 123 is definitely determined at such points or brief intervals. Furthermore, the projections of the cam 53 are so arranged that the selector lever 104 is held against vibration while the abutments 144 and 145 of the interponents 123 are in engagement with the abutments 142 and 143, and in this way the selector lever 104 is securely held against vibration during any of the changes in the setting of the interponents 123.

Due to the flexible connection between the selector lever 104 and the flutter level 108, the accurately timed vibrations of lever 108 can proceed uninterruptedly despite a delayed shifting of the selector lever 104 from one position to the other; that is, despite the fact that the selector lever 104 is locked in its selective position during each impulse interval by the locking lever 116. It is obvious that more time can be allotted or added to the transfer operation of the selection from the selector lever 104 to the interponent members 123, because, owing to the action of springs 112 and 114 on the interconnected members 104 and 108, the shifting of member 104 can occur instantaneously upon its release by locking lever 116 through the disengagement of knife-edges 184 and 185. Thus, an overlap is provided whereby the shifting of flutter lever 108 in correspondence with the nature of the received impulse may occur while the selecting lever 104 is still locked to effect the preceding selecting operation.

By the employment of the selector mechanism of the assisted armature type, as herein disclosed, very small current strengths are sufficient to operate the selector magnet 107, thus permitting the selector magnet to be introduced directly into the line circuit instead of being included in a supplementary, secondary or local circuit controlled by or through a highly sensitive line relay.

In operation an overlap is provided between the selecting operation and the printing operation, the cam 46 being initiated into operation substantially at the termination of the selecting cycle so that the printing of a previously selected character may be effected while a succeeding character is being selected. To effect this overlap the mechanism shown in Figs. 4 and 5 is employed. The selector cam assembly 50 is also provided with a release cam 55 (Fig. 5) which coacts with a release lever 187 pivotally mounted on a shaft 188 carried in the frame of the machine. Lever 187 is provided at one extremity thereof with a cam follower 190 adapted to coact with cam 55. The other arm is provided with a pair of shoulders 189 and 191 to cooperate with arm 192 of a release bail 193 carried on a vertically disposed shaft 194 suitably mounted in the frame of the apparatus.

Lever 187 is held in cooperative engagement with arm 192 by a spring 195 such that when the end of arm 192 engages the notch 189 the cam follower 190 is presented in the circumferential path of the release cam 55 so that at a predetermined instant cam 55 coacts with follower 190 to impart a limited counterclockwise movement (as viewed in Fig. 5) to lever 187 sufficient to disengage arm 192 from shoulder 189. Bail 193 thus is free to move in a clockwise direction under the influence of spring 196 through the instrumentality of a bell crank lever 197 which is also pivotally mounted on shaft 194 and is adjustably secured by slot-and-screw adjustment 198 to bail 193. The clockwise rotation of bail 193 is limited by the shoulder 191, but is sufficient to disengage arm 72 of bail 193 from stop lug 71 of disc 37.

As previously described in connection with Fig. 3; it has been seen that disc 37 is frictionally connected to main shaft 24 and rotates therewith upon removal of the restraining action of arm 72 (Fig. 5). It has also been noted that disc 37 is provided with a driving connection with sleeve 32 through the laterally disposed lug 41 such that sleeve 32 rotates together with disc 37. Cam member 46 is also provided with a driving connection with sleeve 32 as previously described. After the disc 37, upon disengagement of arm 72 from lug 71, has rotated a few degrees through the medium of its frictional connection with shaft 24, the corresponding rotation of sleeve 32 has caused the cam projection 43 to ride off of the follower roller 44 which is mounted on the fixed shaft 45. Sleeve 32 thus is free to move downwardly under the action of spring 47 to effect the engagement of toothed clutch 31. By this means a positive drive connection between shaft 24 and cam 46 is effected during the working period of the cycle of operation of cam 46.

As the stop lug 71 continues in its rotation it cooperates with a cam surface 199 provided on one arm of bell crank 197, the effect of which is to impart counterclockwise rotation to the release bail 193 to effect the reengagement of arm 192 and shoulder 189. Arm 72 thus is again presented into the path of stop lug 71 to effect the arrest of disc 37 at the completion of a single rotation of said disc. Near the completion of the rotation of disc 37 the cam follower 43 again coacts with follower roller 44 to effect the disengagement of the toothed clutch 31. The remaining movement of the disc 37 to its stop position marked by the engagement of lug 71 and arm 72 is effected by the aforementioned frictional connection of disc 37 with shaft 24.

Thus, it is seen that substantially a complete overlap between the selecting operation and the printing and functional operations is provided. The cam 46 and levers 174 and 157 (Fig. 3) cooperate to effect these operations. Cam 46 after the initiation of its rotation effects first the counterclockwise movement of lever 157 (as viewed in Fig. 3) to impart to member 156 downward movement whereupon all of the selector bars 151 are free to respond to the action of their individual springs 154 to be rotated about the pivot rod 152 into engagement with the code discs 118. As already disclosed, the operation of the selector mechanism has effected an alignment of notches in the code discs 118, thus permitting one of the selector bars 151 to enter therein and in consequence thereof the selected bar 151 is permitted to rotate about rod 152 somewhat farther than its companion bars 151, the effect of which is to move its associated push bar 168 into cooperative relation with the striker member 167 through its notch 200. At the proper time in the cycle of operations the lever 174 is rotated in a clockwise direction to permit plunger 164 to respond to the action of printer spring 177 through the instrumentality of lever 175. Plunger 164 and its associated striker disc 167 thus have a sharp upward movement imparted thereto, which movement is imparted through selectively operated push bar 168 to the associated type bar 169 which is rotated sharply to its printing position against a platen 201 Fig. 3 through the rack and pinion connection between said push bar and said type bar. Immediately following the release of the plunger 164 to perform the printing operation, the selector bars 151 are restored to their released or unactuated position out of engagement with code discs 118. This restoration is effected by imparting a clockwise movement to lever 157 to raise in turn the restoration member 156 to its upward position, which member coacts with arms 155 of selector bars 151 to rotate said bars 151 against the action of their springs 154. Since the cam 46 is required to overcome the pull of approximately sixty-four springs 154, the fulcrum 158 of lever 157 is so selected as to produce a mechanical advantage of about three to one. Adjustment 159 is provided to control the clearance between bars 151 and code discs 118. Immediately following the retraction of bars 151 from the code discs 118, the reselection of code discs 118 in accordance with the ensuing received code combination may be effected. The plunger is finally returned to its lowermost position by the cam 46 by imparting counterclockwise rotation to lever 174 whereupon clockwise rotation is imparted to lever 175 to store up energy in the printing spring 177 for a subsequent printing operation.

The reciprocation of the plunger 164 also functions to operate the tape feed mechanism, a feature of which is its separation from and independence of the platen. Having reference to Fig. 3 and more particularly to Fig. 8, it is observed that the upper extremity of the plunger 164 cooperates with an arm 202 of a tape feed lever 203 pivotally mounted on a shaft 204 appropriately carried in the frame of the apparatus. To the extremity of arm 205 of lever 203 is pivotally carried a pawl 206 adapted to coact with a feed ratchet 207 which in the present embodiment of the invention is formed integral with a feed roller 208 (Fig. 2) which is provided with a pair of trunnions by means of which it is rotatably mounted in brackets provided therefor. The pawl 206 is constantly urged into operative engagement with the ratchet 207 by a spring 209 distended between an arm 211 of pawl 206 and an arm 212 of lever 203. The lever 203 is normally rotated in a clockwise direction (as viewed in Fig. 8) into cooperative engagement with plunger 164 by a spring 213 extending from an arm 214 of lever 203 to a spring post 215. Coacting with ratchet 207 to prevent displacement thereof during the feeding operation is a detent member 216 pivoted on a stud shaft 217 and normally urged into cooperative engagement with ratchet 207 by a spring 218.

A pair of pressure rollers 219 (Figs. 2 and 8) are provided which coact with knurled portions of feed roller 208 to effect the movement of a tape 220 in a well-known manner, the rollers 219 being rotatably carried by a lever 221 pivoted at 222 and spring urged against the feed roller 208 by a spring 223 acting on lever 221. A feature of the present invention is the provision of a pair of pressure rollers adapted to engage the edges of the tape instead of a single roller disposed transversely of the tape as heretofore, so that the printed record on the tape is unobstructed to view and visible at all times. The lever 223 is of substantially U-shaped conformation and is provided integrally thereof near the extremities of its arms with a bridge portion 224. Portion 224 is provided, in the present embodiment, with a pair of arms 225 (Fig. 2) adapted to enter a pair of peripheral grooves in the feed roller 208, the dual function of which is, first, to direct the course of the tape as it is fed through the printer during the feeding operation, and, secondly, to cooperate with rollers 208 and 209 to effect the elimination of the tape noise common to printing telegraph machines. The utility of this construction with respect to the first function is especially manifest when it is desired to thread the end of the tape through the feed mechanism, the arms 225 (Fig. 2) operating to deflect the tape upwardly between the bridge portion 224 and pressure rollers 219. It is noted in Fig. 8 that the pressure rollers 219 are located somewhat below the tangential line between feed roller 208 and platen 201, the purpose of which is not only to render the tape 220 taut at all times, but also, by virtue of its cooperation with portion 224, to absorb the vibrations set up in the tape by the printing blows of the type bars, which vibrations if allowed to travel or persist to the free or loose end of a tape would produce an undesirable noise, commonly known as tape noise. It has been found that a sharp depression in the tape made by the pressure rollers 219 and the portion 224 effectively eliminates the tape noise.

Pivotally carried on arm 202 of lever 203 is a platen rotating lever 226, the extremity of which is provided with a plurality of fine teeth to cooperate with a peripheral series of teeth of equal fineness on a ratchet 227 secured to the platen 201. The platen 201 and ratchet 227 are thus adapted to rotate together on a shaft 228, a spring brake means (not shown, but which may be of any well known construction) being provided to prevent back lash of ratchet 227. The pitch of the teeth on lever 226 is slightly different from that on ratchet 227 so as to vary the successive rotational movements of platen 201, whereby the repetition of printing on any particular printing point is not effected until after several revolutions of the platen. Lever 226 is maintained in operative relation with ratchet 227 by a spring 229 distended between lever 226 and arm 202 in an obvious manner (Fig. 8).

When the plunger 164 is operated upwardly to effect the printing of a character the lever 203 is simultaneously rotated in a counterclockwise direction (as viewed in Fig. 8) such that pawl 206 is lowered to engage the succeeding tooth on ratchet 207 and lever 226 is advanced on ratchet 227 preparatory to effecting the limited rotation of ratchet 227. During this movement ratchet 207 is prevented from back spacing or slipping by means of detent 216 and ratchet 227 is held against reverse movement by its frictional connection to shaft 228. When the plunger 164 is returned to its downward position at the completion of the printing operation, the feed mechanism operating spring 213 is effective to impart clockwise rotation to lever 203 to actuate pawl 206 to rotate ratchet 207, and hence feed roller 208, one step, and also to impart through lever 226 rotation to platen 201. It is therefore apparent that as the tape is fed step-by-step through the printing zone by the tape feed mechanism the platen 201 is simultaneously rotated to present for each printing blow of the type bars a different printing surface thereon, thus the same particular printing surface is presented to the printing point a minimum number of times.

The tape may be supplied from a source located either interiorly or exteriorly of the printing apparatus, but in either event the tape is directed preferably through a conduit 231 from right to left, as viewed in Fig. 3, such that the tape is directed in a line tangent to or slightly below the periphery of the platen 201 so as to insure continuous contact therewith, thence over the platen to the feed roller 208. As the tape passes through the printing zone and its surfaces come in contact with the platen, inking ribbon, type faces, conduit 231 and tape guide 232 (Fig. 2), a considerable amount of tape or paper dust is formed, which consists of the loose particles on the tape and scrapings of the somewhat rough surfaces of the tape. The amount of tape dust formed is very considerable when the apparatus is operated at the very high speeds of which it is capable, and to permit this dust to fall into the mechanism and mix with the lubricating oil the effects therefrom are very deleterious; so, to preclude this event, the present invention contemplates the provision of a dust receiver 233, as illustrated in Figs. 2 and 3, of such conformation as to effectually collect the tape dust as well as prevent its admission into the mechanism located therebelow.

The present invention also provides a positively operating power-driven ribbon feed mechanism comprising an automatic ribbon reversing means. As viewed in Fig. 2, a pair of angularly disposed ribbon reels or spools 234 and 235 are provided and are arranged such that the inking ribbon 236 is directed transversely of the tape 220 at the printing point, the effect of which is to permit practically immediate presentation of the printed record to the view of the observer. In the present structure the ribbon 236 is by means of a specially constructed ribbon guide 237, substantially as shown in Fig. 2, adapted to cross upon itself obliquely and thence extend transversely across the tape, the guide 237 being secured by screws 238 to the main frame of the printer, clearance holes for the screws being provided in the tape guide 232. A feature of the present structure resides in the provision of centralizing means to guide the tape through the ribbon guide 237, whereby arm 240 of guide 237 is provided on the edge cooperating with the ribbon with a curved contour, the effect of which is to maintain the ribbon centralized with respect to the arm 240 and thereby prevent the edges of the ribbon from becoming ravelled or frayed, which would occur if the ribbon were permitted to rub against the end of the slot formed by the elbow of arm 240. The tape reels 234 and 235 are of a form commonly used for typewriters and are rotatably mounted on individual stud shafts 239 (Figs. 2 and 15) integral with ribbon feed ratchets 241 and 242, respectively. Each stud shaft 239 is split and terminates in a substantially spherical portion, the purpose of which is to permit the reel to be mounted on the shaft 239 by sliding the reel over the spherical portions, the split shaft permitting the spherical portion to be compressed to the diameter of the bore of the reel as the reel is slid into place after which the reel is adapted to rest loosely on the shaft and is prevented from easily becoming detached by means of the spherical end which has again expanded to its normal size which is substantially larger than the bore of the reel. A driving connection between ratchet 241 and its associated reel is provided by the cooperation of a pin 243 (Fig. 15) integrally formed on ratchet 241 adjacent the shaft 239 with a hole in the side of reel 235. A similar driving connection is provided between reel 234 and ratchet 242.

Ratchet 241 is affixed to a shaft 244 journaled in bearings 245 and 246 (Fig. 2) and is held against endwise movement by a collar 247 pinned to shaft 244. Carried on the shaft 244 between the collar 247 and bearing 246 is a helical compression spring 248 which acts against a washer 249 also carried on said shaft. By means of spring 248 collar 247 is urged against the bearing 245, the effect of which is to provide a frictional drag to prevent ratchet 241 from rotating too freely. Similarly, ratchet 242 is affixed to a shaft 251 and correspondingly arranged.

Figure 14:
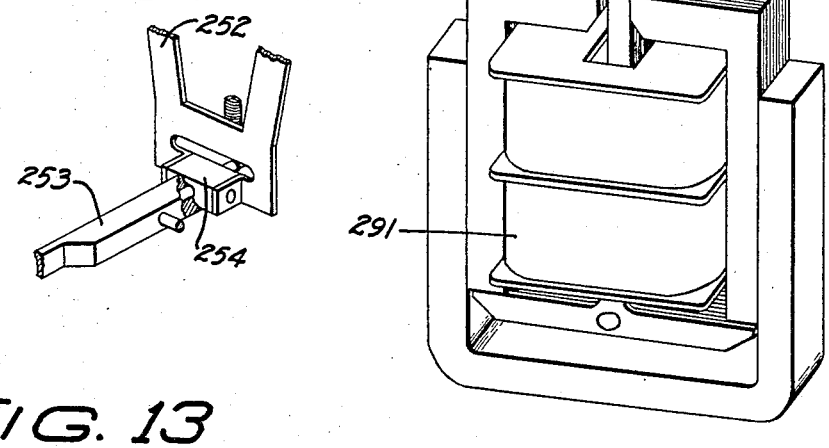

Ratchets 241 and 242 are provided on bevelled edges thereof with numerous ratchet teeth and cooperate with a common pawl member 252 (Figs. 15, 16, 17) which coacts during alternate periods determined by a ribbon reversing mechanism with one or the other of said ratchets. Pawl member 252 is pivotally connected to an operating arm 253 by means of a universal connection 254 (Fig. 14) and is pivotally carried by a bracket 255 (Fig. 3) mounted in the frame of the apparatus. Arm 253 coacts with a plunger 256 (Fig. 3) slidably carried in guide 165 which in turn cooperates with operating lever 174; thus each time the lever 174 is operated to effect the printing function the ribbon feed operation is simultaneously performed. Through the instrumentality of the universal connection 254 not only is a vertically reciprocating motion imparted to pawl 252 by lever 253, but also an oscillatory movement is imparted to pawl 252 by the ribbon reverse mechanism, as will presently appear.

In the position shown in Fig. 15, pawl 252, when reciprocated vertically, causes ratchet 241 to rotate step-by-step to pull the ribbon from reel 234 and to wind it on reel 235. An automatically operated ribbon reversing means has been provided which is effective when the supply of ribbon from one or the other of reels 234 and 235 has become nearly exhausted. As indicated in Fig. 15, for example, a ribbon reverse bail 257 is provided which is pivotally mounted by means of its laterally disposed arms 258 and 259 to a pair of pivots 260 and 261. Secured to the upper part of bail 257 is a member 262 provided with a pair of ribbon reversing arms the extremities of which are bifurcated to permit the threading of the inking ribbon therethrough. A rivet 263 is provided near each end of the ribbon so that when the supply of ribbon is nearly exhausted from one or the other of the reels the rivet near the end of the ribbon from the exhausted reel will fail to pass through the slit end of the ribbon reversing arm and thereby cause the bail 257 to be rotated about pivots 260 and 261 due to the pull of the opposite reel upon the ribbon.

As shown in Fig. 15, the bail 257 has just been rotated in a clockwise direction by means of rivet 263 to a position preparatory to the reversal of operation of the ribbon reversing mechanism which is effected in the following manner. Bail 257 upon being rotated clockwise, as previously described, causes foot 264 to be introduced beneath the vertically reciprocating pawl 252 so that upon its next downward stroke pawl 252 will cooperate with the vertically immovable foot 264 to cause pawl 252 to rotate clockwise (as viewed in Fig. 15) about the universal connection 254 until said pawl engages the teeth on ratchet 242 as shown in Figs. 16 and 17; the vertical reciprocation of pawl 252 being thereafter effective to actuate ratchet 242 until the reversing bail 257 has been operated by the rivet near the opposite end of the ribbon, or that end associated with reel 235, whereupon the bail 257 will be rotated counterclockwise to introduce foot 265 beneath pawl 252 in like manner and with like result as previously set forth in connection with foot 264. As indicated in Fig. 17, pawl 252 is guided by means of guide members 266 and 267 carried in the frame of the machine.

Arm 258 of bail 257 terminates in a V-shaped end adapted to coact with a detent means 268 (Figs. 2 and 3) comprising a cap member 269, mounted on bracket 271, in which is slidably carried a rod 272 to one end of which is affixed a ball 273. Carried on rod 272 is a helical compression spring 274 which normally acts to urge ball 273 toward the left (as viewed in Fig. 3) into cooperation with arm 258 of bail member 257. The bail 257 upon being actuated to its reversed position upon completion of each ribbon reversing operation is thus maintained thereat through the instrumentality of detent means 268.

Pawl 252 is maintained in its actuated position by a detent means which comprises a rocking member 275 loosely mounted on a stud shaft 276 secured to bracket 271, and a spring 277. Rocking member 275 is provided with a depending arm 278 at the extremity of which is carried a spring post 279 to which is attached one end of the spring 277, the other end of which is attached to a spring post 281 carried on the pawl member 252. The members 252 and 275 are so arranged by means of slot and pin connection 280 and 281 therebetween that when pawl 252 assumes its non-normal intermediate position, said members and spring 277 are in alignment and in a condition of unstable balance or unstable equilibrium so that the slightest urge upon pawl 252 to one side or the other, as by means of reverse bail 257, will disturb this balance and cause spring 277, which at this intermediate position is distended to its fullest extent, to contract and thereby compel movement of member 275 and pawl 252 to the corresponding side, whereupon pin 280 is no longer aligned with post 279 and pivot 276 but is disposed, for example, to the right thereof (as viewed in Fig. 15), the tension of spring 277 acting to urge pawl 252 toward the ratchet 241. With this arrangement the action of bail 257 upon pawl 252 need only be sufficient to swing pawl 252 up to and slightly beyond the intermediate position, the spring 277 functioning thereafter to carry the pawl member into engagement with the ratchet 241 or 242. The movement of member 275 is limited by the arms 282 and 283 thereof cooperating with pivot studs 284 and 285, so that upon the oscillation of member 275 to one side or the other and its arrest by stud 284 or 285, the pull of spring 277 is directed thereafter solely upon pawl 252 to urge it further in its corresponding direction into engagement with ratchet 241 or 242 as the case may be. In actual operation, of course, the pawl 252 is swung directly from one operative position to the other by bail 257, the unstable central or intermediate position being merely a passing condition as the pawl 252 moves to either side.

Cooperating with pawl 252 and pivotally mounted on studs 284 and 285 are a pair of check pawls 286 and 287 to which rotation in opposite directions is imparted by a spring 288 common thereto, as clearly shown in Figs. 15, 16 and 17. The function of the check pawls 286 and 287 is to prevent the back slipping or back lashing of the operated ratchet 241 or 242 during the rapidly reciprocating movement of pawl 252. Each of the check pawls 286 and 287 is provided with an extension 289 adapted to cooperate with the pawl 252 to control the effectiveness of the check pawls in correspondence with the position of pawl 252.

In Fig. 7 is illustrated a portion of so-called ticker tape printed with the apparatus according to the present invention. As is commonly known, the printing or recording is done in offset lines to facilitate the reading of the stock quotations, the stock or item comprising the "letters" characters being recorded in the upper line and the price or quotation comprising the "figures" characters being recorded in the lower line. In the present apparatus the offset printing is effected entirely without the use of a shift mechanism, the position of the typeface on the type bar being the sole means of determining the line in which printing is to take place. To effect printing in the upright position, as indicated in Fig. 7, the type faces are arranged on the type bars 169 in the manner shown in Figs. 19 and 20. That is, the type characters carried by the type bars located in the right arcuate support (as viewed in Fig. 2) are arranged to have their top edges nearest the pivot as shown in Fig. 19, while the type characters carried by the type bars located in the left arcuate support are arranged to have their bottom edges nearest the pivot as indicated in Fig. 20.

Modification

Figure 13:
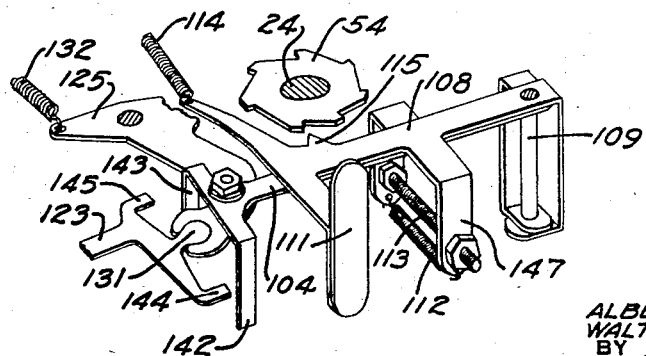
Fig. 13 is a perspective view illustrating part of the mechanism of the assisted armature type selector.

An alternate form of selector magnet suitable for two-current or polar operation is illustrated in Fig. 12, wherein is shown a polarized magnet 291 substantially of the type disclosed in Patent No. 1,892,358, granted Dec. 27, 1932 to O. Morgenstern, the extended armature 292 of which is adapted to operate, in response to marking and spacing impulses of opposite polarity, between a pair of adjustable stops 293 and 294. The extremity of armature 292 is pivotally articulated to the depending arm of a bell crank 295 pivotally mounted on pivot 296 appropriately positioned in the selector mechanism. The horizontal arm of bell crank 295 terminates in a vertically disposed portion 297 adapted to coact with the end of an extension 298 on flutter lever 299. Flutter lever 299 is not in the present illustration provided with an armature analogous to armature 111 shown in Fig. 13, but instead is provided with the extension 298 which functions to control flutter lever 299 mechanically instead of magnetically as in the case of armature 111. The flutter 299 as it is operated by the flutter cam 54, in a manner previously described, actuates its extension 298 between the solid-line and dotted-line positions shown in Fig. 12, unless extension 298 is blocked by the vertically disposed portion 297 of bell crank 295.

Similar to neutral magnet 107, the polar magnet 291 is connected directly in the line circuit, and as is apparent from the foregoing description the polarized magnet 291 is normally impressed with marking current and hence the armature 292 thereof is in its right-hand or marking position (as viewed in Fig. 12). In this position armature 292 maintains bell crank 295 in blocking relationship with extension 298 to hold flutter lever 299 in its counterclockwise position against the action of its restoring spring 302, similarly as in the case of flutter lever 108, in Fig. 13.

The flutter lever 299 in the present instance is alone pivotally mounted on fixed shaft 109, an alternate form of mounting levers 104 and 299 being suggested in Fig. 12 under discussion. In this example, the relation between the main shaft 24 and pivot shaft 109 for the flutter lever 299 is fixed and owing to the adjustment desired between selector lever 104 and the interponents 123 the selector lever 104 is pivotally mounted on a pivot shaft 301 which in turn is carried in an adjustable bracket (not shown), which arrangement provides for still greater flexibility of the selecting mechanism of the present invention. A resilient interconnection is provided between flutter lever 299 and selector lever 104 through the instrumentality of spring 303 and adjustable set screw 304 analogous to spring 112 and screw 113, in Fig. 13, and similarly operative.

Upon the receipt of a start impulse, which, as previously mentioned, is of spacing nature, the armature 292 is operated to its left-hand or spacing position against stop 293 to rotate bell crank 295 a predetermined amount so that its portion 297 is withdrawn from blocking engagement with extension 298 to permit flutter lever 299 to rotate clockwise about its pivot 109 under the action of spring 302 to effect through arm 103 of trip member 99 the release of cam barrel assembly 51 for rotation, as previously described. Flutter lever 299 thus is caused to vibrate by means of flutter cam 54 in accurate timed relation with the signal impulses unless the extension 298 thereof is blocked by the portion 297, in which event the flutter lever 299 will be held against rotation during that particular signal impulse interval; that is, if the first selecting impulse is of marking nature the armature 292 will assume its right-hand position to hold, through portion 297 of bell crank 295 and extension 298, flutter lever 299 in its counterclockwise position, which lever has been moved thereto by the first projection on the cam 53.

Assuming that the second impulse is of spacing nature, the flutter lever 299 will have been first moved to its counterclockwise position by the second cam projection on cam 53, but since the armature 292 is maintained in its left-hand position against stop 293 by the magnetic effect of the spacing impulse upon polarized magnet 291, the flutter lever 299, not being in this instance blocked by portion 297, will be returned to its dotted-line position by spring 302 in a manner analogous to the action described in connection with Fig. 13. The selector lever 104 will respond to the movement of the flutter lever 299 through the flexible interconnection therewith in a manner as previously set forth, and the succeeding impulses of the code signal will control the selector mechanism in a similar manner.

The principles and desirable features here described are likewise applicable to a wide range of selecting mechanisms and telegraphically controlled and operated devices, and although the present invention has been disclosed and described with reference to preferred embodiments it is, of course, understood that the invention is capable of embodiment in many and widely varied forms other than that specifically disclosed without departing from the spirit and scope of the present invention, and all changes which come within the meaning and range of equivalency of the claims are therefore intended to be embraced therein.

What is claimed is:

1. In a printing telegraph receiver, a plurality of vertically disposed type-bars, a plurality of selector members arranged in superposed horizontal planes and in operative relation to said type-bars, an electromagnetic selecting mechanism to select through said members a type-bar, and responsive to code combinations of impulse intervals comprising means to cooperate with said members to effect a codal overlap, and a power-driven armature-assisting means to cooperate with said means to effect within said codal overlap an intervallic overlap of the selective operations, and means operative following the selection of the type-bar for effecting its operation.

2. In a printing telegraph receiver, a plurality of vertically disposed type-bars circularly arranged, a plurality of selector discs arranged in superposed horizontal planes below said type-bars, a first means for operating said discs to select one of said type-bars, a second means responsive to code combinations of equal length impulse intervals to prepare said first means for a new selective operation while said first means is effectuating the preceding operation to thereby effect a codal overlap of the selective operations, and further means to cooperate with said second means to effect within said codal overlap an intervallic overlap of the selective operations.

3. In a printing telegraph receiver, a plurality of vertically disposed type-bars circularly arranged, a plurality of selector discs arranged in superposed horizontal planes below said type-bars, a first means for operating said discs to select one of said type-bars, a second means responsive to received code combinations of electrical impulse conditions to prepare said first means for a new selective operation while it is effectuating the preceding operation to effect a codal overlap of the selective operations, and additional means operative in timed relation to the impulse intervals to cooperate with said second means to effect an intervallic overlap within said codal overlap.

4. In a printing telegraph receiver, a support, a plurality of selecting members held in different horizontal planes by said support, a plurality of type-bars arranged in a circle and positioned in stationary planes above said members, a plurality of latch members, each having an operating and a non-operating position, means whereby said latch members are normally urged toward their operating position, a single magnet selector mechanism responsive to current impulses for operating said selecting members for enabling one of said latch members to assume its operating position, and means to record from said type-bars under the control of said operated latch member.

5. In a telegraph receiver, a plurality of pivoted type-bars, a plurality of actuating bars for said type-bars, a plurality of selectable members controlling said actuating bars, a set of notched code discs controlling said selectable members, a striker disc for operating said actuating bars, a single magnet selector mechanism responsive to current impulses comprising a power-driven armature-assisting means for operating said code discs to select one of said members to effect the cooperation of its corresponding actuating bar with said striker disc, and means for operating said striker disc to effect recordation.

6. In a telegraph recorder, a plurality of pivoted type-bars, a plurality of actuating bars for said type-bars, a plurality of selectable elements for controlling said actuating bars each having an operating and a non-operating position, a single magnet selector mechanism responsive to code combinations of impulse intervals comprising a first means for effecting a codal overlap of the selective operatives whereby a selected element may be effective for controlling the operative positionment of said selectable elements simultaneously with the selection of another element and a second means adapted to cooperate with said first means to effect within said codal overlap an intervallic overlap of the selective operations, and means operated following the selection of any one of said elements for effecting recordation.

7. In a printing telegraph receiver, a plurality of vertical type-bars movable in printing toward a common center in planes which all intersect on a common axis, printing means for said type-bars, a selector mechanism comprising a magnet responsive to current impulses and a power-driven armature-assisting means to selectively condition said type-bars for operation, and means controlled by said selector mechanism to operate said printing means to effectuate the recording operation.

8. In a telegraph printer, a plurality of pivoted type-bars for printing on a tape, a single magnet selector mechanism responsive to received code combinations of impulses comprising a power-driven armature-assisting means to select a type-bar having a single type-face for operation, and means including a non-shiftable rotatable platen to form character spaces, the relative position of said type and tape being determinative of printing in offset lines.

9. In a telegraph receiver, a plurality of type-bars, each of said type-bars provided with a single type-face, a plurality of actuating bars for said type-bars, a plurality of selectable members controlling said actuating bars, a single magnet selector mechanism responsive to received code combinations of impulses comprising a power-driven armature-assisting means to select one of said members, and means operated following the selection of said member to effect recordation, the recording in offset lines being determined solely by the positional relationship between said type-faces and the record receiving material.

10. In a telegraph printer, a plurality of type-bars, each type-bar provided with a single type, said type being divided into groups, a single magnet selecting means responsive to received code combinations of signal impulses and comprising a power-driven armature-assisting device to control the recordation of the different groups in different vertical positions on record receiving material, the recording in off-set lines being determined solely by the positional relationship between said type faces and said record receiving material.

11. In a printing telegraph receiver, a platen, a single magnet selector mechanism responsive to code combinations of equal length impulse intervals comprising a power-driven armature-assisting means operable synchronously with the speed of code impulsing, a plurality of type levers responsive to said selecting mechanism and cooperating with said platen for printing any desired character, means for placing said selecting mechanism in readiness for the selection of a character before the printing of the preceding character selected thereby is completed whereby a codal overlap is effected, and means to effect an intervallic overlap within said codal overlap.

12. In a telegraph receiver, a selecting mechanism responsive to received code combinations of electrical impulses comprising a set of selectors, an electromagnet, an armature lever therefor, and a rotary cam member cooperating with said armature lever to set said selectors in different combinations, a motor actuated friction clutch for rotating said cam member, a stop dog for arresting said cam member, a latch for holding said dog in operative position, a support adjustable on an axis coincident with the axis of said cam member whereon said stop dog and latch are mounted, a pivoted trip lever actuated by said armature lever and engaging said latch at a point coincident with the axis of said cam member, and positive mechanical means for effecting the adjustment of said support to secure the proper orientation of the cam member with the received code combinations of impulses.

13. In a printing telegraph receiver, a plurality of vertically disposed type-bars circularly arranged, a plurality of selector discs arranged in superposed horizontal planes below said type-bars, means responsive to received code combinations of electrical impulse conditions to operate said discs to select one of said type-bars, and additional means operative in timed relation to the impulse intervals to cooperate with said means to effect an intervallic overlap of the selective operations.

14. In a printing telegraph receiver, a vertically extending support, a plurality of selecting members supported in different horizontal planes by said support, a plurality of vertically disposed type-bars arranged in a circle and pivotally positioned in stationary planes above said members, means for moving said members in their respective horizontal planes to select a type-bar, and means responsive following the selection for pivoting the selected type-bar downwardly to record the character carried thereby.

15. In a printing telegraph receiver, a support, a plurality of selector members supported in different horizontal planes by said support, a plurality of type-bars arranged in a circle and positioned directly above said members, a plurality of drop bars, each having an operating and a non-operating position, means whereby said drop bars are normally urged toward their operating position with respect to said members, a cam shaft disposed parallel to the vertical axis of said support and carrying a selector cam and a plurality of operating cams thereon, said selecting members operatively controlled by said selector cam to permit one of said drop bars to assume its operating position, and means controlled by said operating cams to effect printing from said type-bars under the control of said operated drop bar.

16. In a printing telegraph receiver, a plurality of vertically disposed type-bars, a plurality of selector members arranged in superposed horizontal planes and in operative relation to said type-bars, an electromagnetic selector mechanism responsive to current impulses for operating said members to select one of said type-bars, and means operated following the selection of the type-bar for effecting its operation, said means comprising a motor subjacently disposed with respect to all of said previously recited elements and operatively connected therewith, and insulated therefrom to abate the effect of the heat generated by said motor.

17. In a printing telegraph receiver, a support, a plurality of selector members supported in different horizontal planes by said support, a plurality of type-bars arranged in a circle and positioned directly above said members, a plurality of drop bars, each having an operating and a non-operating position, means whereby said drop bars are normally urged toward their operating position with respect to said members, a cam shaft disposed parallel to the vertical axis of said support and carrying a selector cam and a plurality of operating cams thereon, said selecting members operatively controlled by said selector cam to permit one of said drop bars to assume its operating position, means controlled by said operating cams to effect printing from said type-bars under the control of said operated drop bar, and a motor for operating said cam shaft subjacently disposed in said support and insulated from the superposed mechanism to abate the effect of the heat generated by said motor.

18. In a printing telegraph receiver, a support, a plurality of selector discs supported in different horizontal planes by said support, a plurality of drop bars, each having an operating and a non-operating position, means for selectively operating said drop bars, a typing unit comprising a plurality of vertically disposed type-bars and a corresponding plurality of actuating bars, said unit detachably mountable on said support and operatively relatable through said actuating bars to said drop bars, and means operated following the selection of a drop bar for effecting the printing operation.

19. In a printing telegraph receiver, a support, a typing unit detachably mountable on said support, said unit comprising a plurality of vertically disposed type-bars and a corresponding plurality of actuating bars, a plurality of selector members arranged in said support in superposed horizontal planes and in operative relation to said actuating bars, an electromagnetic selector mechanism responsive to current impulses comprising a power-driven armature-assisting means for operating said members to select one of said type-bars, and means operated following the selection of the type-bar for effecting its operation.

20. In a printing telegraph receiver, a plurality of vertically disposed type-bars, a plurality of selector members arranged in superposed horizontal planes and in operative relation to said type-bars, an electromagnetic selector mechanism responsive to current impulses comprising a power-driven armature-assisting means for operating said members to select one of said type bars, and spring-actuated means released following the selection of the type-bar for effecting its operation.

21. In a printing telegraph receiver, a plurality of vertically disposed type-bars, a plurality of selector members arranged in superposed horizontal planes and in operative relation to said type-bars, an electromagnetic selector mechanism responsive to current impulses comprising a power-driven armature-assisting means for operating said members to select one of said type bars, and spring-actuated means released following the selection of the type-bar for effecting its operation, said last recited means comprising means to vary the operative effect of said type-bar.

22. In a telegraph receiver, a selecting mechanism responsive to received code combinations of electrical impulses comprising a set of selectors, an electromagnet, an armature lever therefor, and a cyclically operable cam member cooperating with said armature lever to set said selectors in different combinations, a motor actuated friction clutch for rotating said cam member, a stop dog for arresting said cam member, a latch for holding said dog in operative position, a support adjustable on an axis coincident with the axis of said cam member whereon said stop dog and latch are mounted, a pivoted trip lever actuated by said armature lever and engaging said latch at a point coincident with the axis of said cam member to operate said latch to initiate the cyclic movement of said cam member, means to limit the coaction of said armature lever and said trip lever, and positive mechanical means for effecting the adjustment of said support to secure the proper orientation of the cam member with the received code combinations of impulses.

23. In a telegraph receiver, a plurality of vertically disposed recording elements, a plurality of selector members arranged in superposed horizontal planes and in operative relation to said elements, a selector mechanism to select through said members one of said elements, and responsive to code combinations of impulse intervals comprising a first means to cooperate with said members to effect a codal overlap and a second means to cooperate with said first means to effect within said codal overlap an intervallic overlap of the selective operations, and means operated following the selection of the element for effecting its operation.

24. In a recorder, a plurality of recording elements, a plurality of selector members arranged in operative relation to said elements, a first means for operating said members to select one of said elements, a second means responsive to code combinations of impulses to prepare said first means for a new selective operation while said first means is effectuating the preceding operation to thereby effect a codal overlap of the selective operations, and further means adapted to co-operate with said second means to effect within said codal overlap an intervallic overlap of the selective operations.

25. In a printing telegraph, a plurality of selector members arranged in superposed horizontal planes, a plurality of vertically disposed type-bars arranged in a circle and pivotally positioned in stationary planes above said members, characters carried by said type-bars, the characters on certain type bars having the top edge of the characters nearest the pivot of the corresponding bar, and others having the bottom edge of the characters nearest the pivot of the corresponding type-bar, means for moving said selector members in their respective horizontal planes to select a type-bar, and means responsive following the selection for pivoting the selected type-bar downwardly to record the character carried thereby in an upright position.

26. In a printing telegraph, a plurality of pivoted type-bars, a plurality of actuating bars for said type-bars, a corresponding plurality of selectable elements controlling said actuating bars, a set of selector members controlling said selectable elements, a striker member for operating said actuating bars, a single magnet selector mechanism responsive to current impulses for operating said selector members to select one of said elements to effect the cooperation of its corresponding actuating bar with said striker member, and means for operating said striker member to effect printing.

27. In a telegraph receiver, a plurality of pivoted elements, a plurality of actuating bars for said elements, a corresponding plurality of selectable members controlling said actuating bars, a set of selector members controlling said selectable members, a striker member for operating said actuating bars, a single magnet selector mechanism responsive to current impulses for operating said selector members to select one of said selectable members to effect the cooperation of its corresponding actuating bar with said striker member, and means for operating said striker member to effect the operation of the selected pivoted element.

28. In a telegraph receiver, a plurality of selecting members arranged in different horizontal planes, a plurality of selectable elements cooperatively related to said selecting members, a plurality of vertically disposed recording elements pivotally positioned directly above said selecting members, individual interconnection between each recording element and its corresponding selectable member, means for moving said selecting members in their respective horizontal planes to effect a selection, and means responsive following the selection for pivoting the selected recording element downwardly to make a record corresponding thereto.

29. In a telegraph recorder, a plurality of recording elements, a plurality of actuating bars for said elements, a plurality of selectable members for controlling said actuating bars each having an operating and a non-operating position, a selector mechanism responsive to code combinations of impulse intervals comprising a first means for effecting a codal overlap of the selective operations whereby a selected member may be effective for controlling the operative positionment of said selectable elements simultaneously with the selection of another element and a second means adapted to cooperate with said first means to effect within said codal overlap an intervallic overlap of the selective operations, and means operated following the selection of any one of said elements for effective recordation.

30. In a recorder, a plurality of recording elements, a plurality of selector members arranged in operative relation to said elements, mechanism to select through said members an element and responsive to code combinations of impulse intervals comprising a first means to cooperate with said members to effect a codal overlap, and a second means to cooperate with said first means to effect within said codal overlap an intervallic overlap of the selective operations, and means operative following the selection of the element for effecting its operation.

31. In a recorder, a plurality of recording elements arranged in two arcuate opposed supports, means to carry a record tape between said supports, a ribbon feed mechanism disposed on the ingress side of the tape carrying means and comprising means for directing the ribbon transversely of the tape at the recording area to render the record visible following each recording operation, and means to effect a printing operation in off-set lines, the printing in off-set lines being determined solely by the positional relationship between said recording elements and the tape.

32. In a recorder, a plurality of selecting members held in different horizontal planes, a plurality of recording elements arranged in two arcuate opposed supports and positioned above said members, means to carry a record tape between said supports, a plurality of latch members, each having an operating and a non-operating position, means whereby said latch members are normally urged toward their operating position, a selector mechanism responsive to current impulses for operating said selecting members for enabling one of said latch members to assume its operating position, and means to operate a recording element under the control of said operated latch member to make a record on the tape.

33. In a recorder, a plurality of recording elements arranged in two arcuate opposed supports, means to carry a record tape between said supports, a pair of angularly disposed ribbon carriers located at the ingress side of the tape carrying means, and a ribbon feed mechanism comprising a ribbon directing means adapted to cause the ribbon from said carriers to cross upon itself obliquely prior to crossing the tape transversely at the recording area to render the record visible following each recording operation.

34. In a telegraph printer, a plurality of type-bars arranged in two arcuate supports, each of said type-bars provided with a single type-face, a plurality of actuating bars for said type-bars, a plurality of selectable members controlling said actuating bars, a selector mechanism responsive to received code combinations of impulses to select one of said members, means to carry a tape between said supports, and means operated following the selection of said member to effect a printing operation in off-set lines, the printing in offset lines being determined solely by the positional relationship between said type-faces and the tape.

35. In a recorder, a plurality of recording elements circularly arranged, a plurality of selector members arranged in superposed horizontal planes, means responsive to received code combinations of electrical impulse conditions to operate said members to select one of said elements, and additional means operative in timed relation to the impulse intervals adapted to cooperate with said means to effect an intervallic overlap of the selective operations.

36. In a recorder, a plurality of recording elements, a plurality of selector members arranged in superposed horizontal planes and in operative relation to said elements, a selector mechanism responsive to current impulses for operating said members to select one of said recording elements, and means operated following the selection of the recording element for effecting its operation, said means comprising a motor subjacently disposed with respect to all of said previously recited elements and operatively connected therewith, and insulated therefrom to abate the effect of the heat generated by said motor.

37. In a telegraph printer, a support, a plurality of selector members carried in said support, a plurality of drop bars, means for selectively operating said members to select a drop bar, a typing-unit comprising a plurality of type-bars and a corresponding plurality of actuating bars, said unit detachably mountable on said support and operatively relatable through said actuating bars to said drop bars, and means operated following the selection of a drop bar for effecting the printing operation.

38. In a telegraph printer, a support, a plurality of selector members carried in said support, a plurality of drop bars, each having an operating and a non-operating position, means whereby said drop bars are normally urged toward their operating position, means for selectively operating said members to enable one of said drop bars to assume its operating position, a typing unit comprising a plurality of type-bars and a corresponding plurality of actuating bars, said unit detachably mountable on said support and operatively relatable through said actuating bars to said drop bars, and means operated following the selection of a drop bar for effecting the printing operation.

39. In a recorder, a support, a unit detachably mountable on said support comprising a plurality of recording elements and a corresponding plurality of actuating members, a plurality of selectable elements, a plurality of selector members arranged in said support and in operative relation to said selectable elements, said unit operatively relatable through said actuating members to said selectable elements, a selector mechanism responsive to current impulses for operating said selector members to select, through one of said selectable elements and its associated actuating member, one of said recording elements, and means operated following the selection of the recording element for effecting its operation.

40. In a recorder, a plurality of recording elements, a plurality of selector members in operative relation to said elements, a selector mechanism responsive to current impulses comprising a power-driven armature-assisting means for operating said members to select one of said elements, and spring-actuated means released following the selection of the element for effecting its operation.

41. In a telegraph printer, a plurality of type-bars movable in printing toward a common locus and operable invariably and only in their respective immovable planes, printing means for said type-bars, a selector mechanism comprising a magnet responsive to current impulses, and a power-driven armature-assisting means to selectively condition said type-bars for operation, and means controlled by said selector mechanism to operate said printing means to effectuate the printing operation.

42. In a telegraph recorder, a plurality of recording elements, a plurality of selector members arranged in superposed horizontal planes and in operative relation to said elements, an electromagnetic selector mechanism responsive to current impulses comprising a power-driven armature-assisted means for operating said members to select one of said elements, and spring-actuated means released following the selection of the recording elements for effecting its operation.

43. In a telegraph recorder, a plurality of recording elements, a plurality of selector members arranged in superposed horizontal planes and in operative relation to said elements, an electromagnetic selector mechanism responsive to current impulses comprising a power-driven armature-assisting means for operating said members to select one of said elements, and spring-actuated means released following the selection of the recording element for effecting its operation, said last recited means comprising means to vary the operative effect of said recording element.

44. In a telegraph printer, a support, a plurality of selector members carried in said support, a plurality of selectable bars, means for selectively operating said members to select a bar, a type-unit comprising a plurality of type members and a corresponding plurality of interponents, said unit detachably mountable on said support and operatively relatable through said interponents to said bars, and means operated following the selection of a bar for effecting the printing operation.

ALBERT H. REIBER.
WALTER J. ZENNER.